United States Patent
Hirao et al.

(10) Patent No.: US 7,664,001 B2
(45) Date of Patent: Feb. 16, 2010

(54) METHOD OF HOLOGRAPHIC RECORDING AND REPRODUCTION, HOLOGRAPHIC RECORDING MEDIUM AND HOLOGRAPHIC RECORDING AND REPRODUCING APPARATUS

(75) Inventors: Akiko Hirao, Chiba (JP); Yuji Kubota, Yokohama (JP); Kazuki Matsumoto, Kawasaki (JP); Naru Ikeda, Yokohama (JP); Yoshinori Honguh, Yokohama (JP); Yuzo Hirayama, Yokohama (JP); Tatsuo Saishu, Tokyo (JP); Junichi Akiyama, Kawasaki (JP)

(73) Assignee: Kabushiki Kaish Toshiba, Tokyo (JP)

( * ) Notice: Subject to any disclaimer, the term of this patent is extended or adjusted under 35 U.S.C. 154(b) by 795 days.

(21) Appl. No.: 11/337,675

(22) Filed: Jan. 24, 2006

(65) Prior Publication Data

US 2006/0215528 A1    Sep. 28, 2006

(30) Foreign Application Priority Data

Mar. 25, 2005    (JP) .............................. 2005-088199

(51) Int. Cl.
   *G11B 7/00* (2006.01)
(52) U.S. Cl. ..................................... 369/103
(58) Field of Classification Search ................. 369/103
   See application file for complete search history.

(56) References Cited

U.S. PATENT DOCUMENTS 6,256,281 B1 *  7/2001  Tanaka et al. ............... 369/103

6,958,967 B2 * 10/2005  Kasazumi et al. ........... 369/103
7,512,054 B2 *  3/2009  Matsumoto et al. ......... 369/103

FOREIGN PATENT DOCUMENTS

JP    2002-123949    4/2002
JP    2002-216359    8/2002

OTHER PUBLICATIONS

Matsumoto, et al., "Method for Optical Recording, Method for Optical Reproducing, Optical Recording Medium, and Optical Recording and Reproducing Apparatus Utilizing Holography", U.S. Appl. No. 11/231,251, filed Sep. 21, 2005.
Sincerbox, "History and Physical Principles," H.J. Coufal's Holographic Data Storage, Springer, Berlin, pp. 3-11 (2000).

* cited by examiner

*Primary Examiner*—Nabil Z Hindi
(74) *Attorney, Agent, or Firm*—Finnegan, Henderson, Farabow, Garrett & Dunner, L.L.P.

(57) ABSTRACT

A method of holographic recording and reproduction includes recording to the holographic recording medium a wavelength variation reference pattern which is recorded as a hologram at a wavelength of the recording beam, recording to the holographic recording medium a page data pattern as a hologram at the wavelength of the recording beam, detecting the wavelength variation between the recording beam and the reproducing beam based on the size of an image for wavelength variation reference obtained by reproducing the wavelength variation reference pattern at a wavelength of the reproducing beam, and reproducing the page data pattern using the reproducing beam with a wavelength controlled based on the detected wavelength variation.

17 Claims, 22 Drawing Sheets

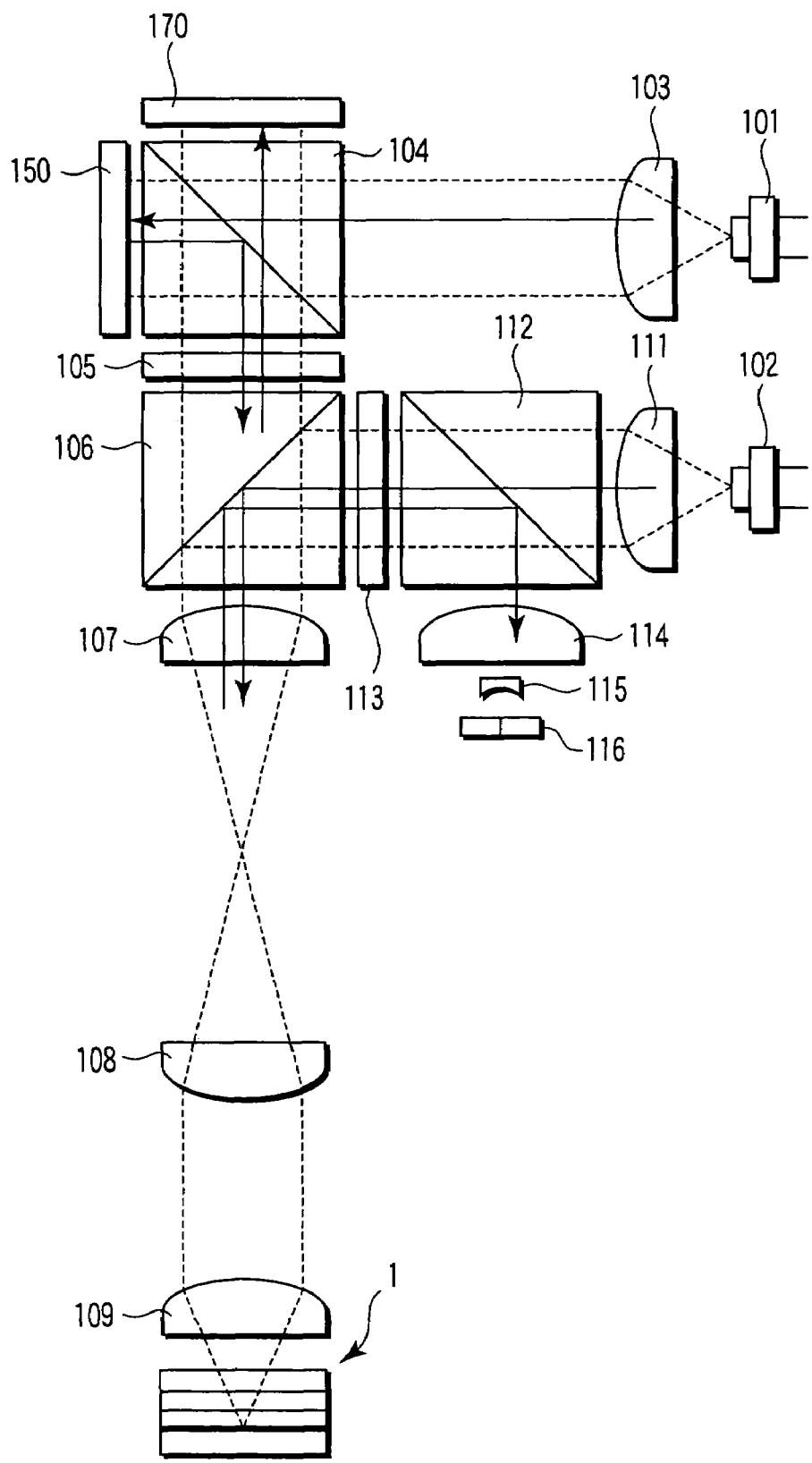
F I G. 2

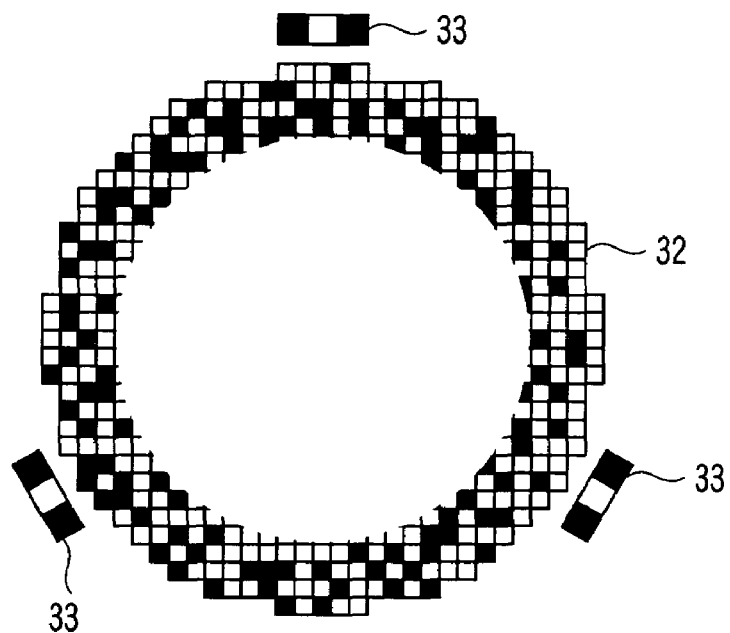
F I G. 14
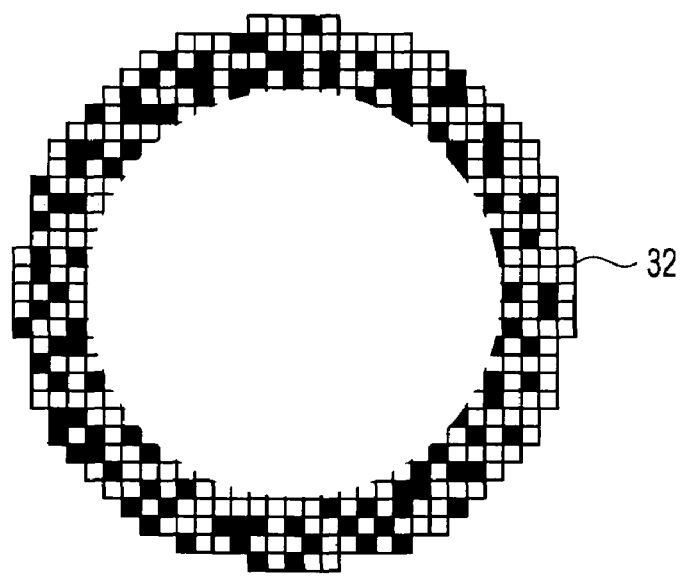
F I G. 15

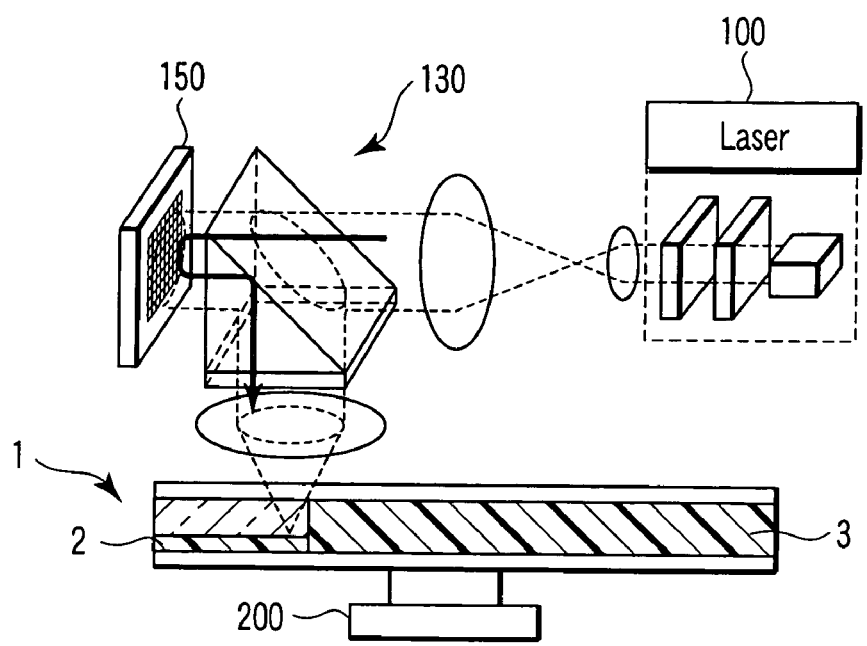
F I G. 21A
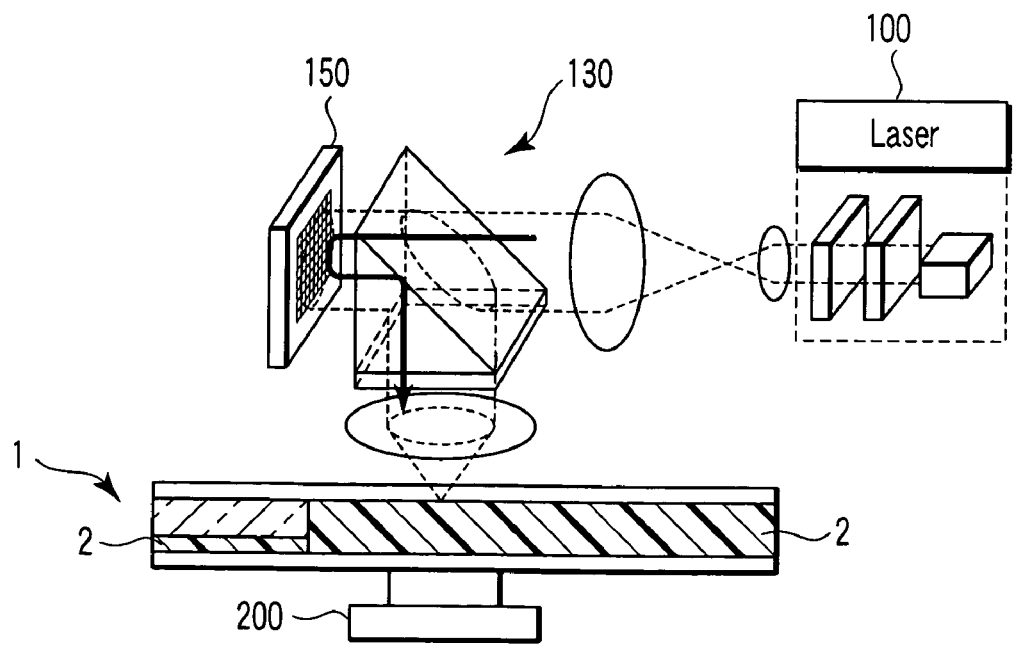
F I G. 21B

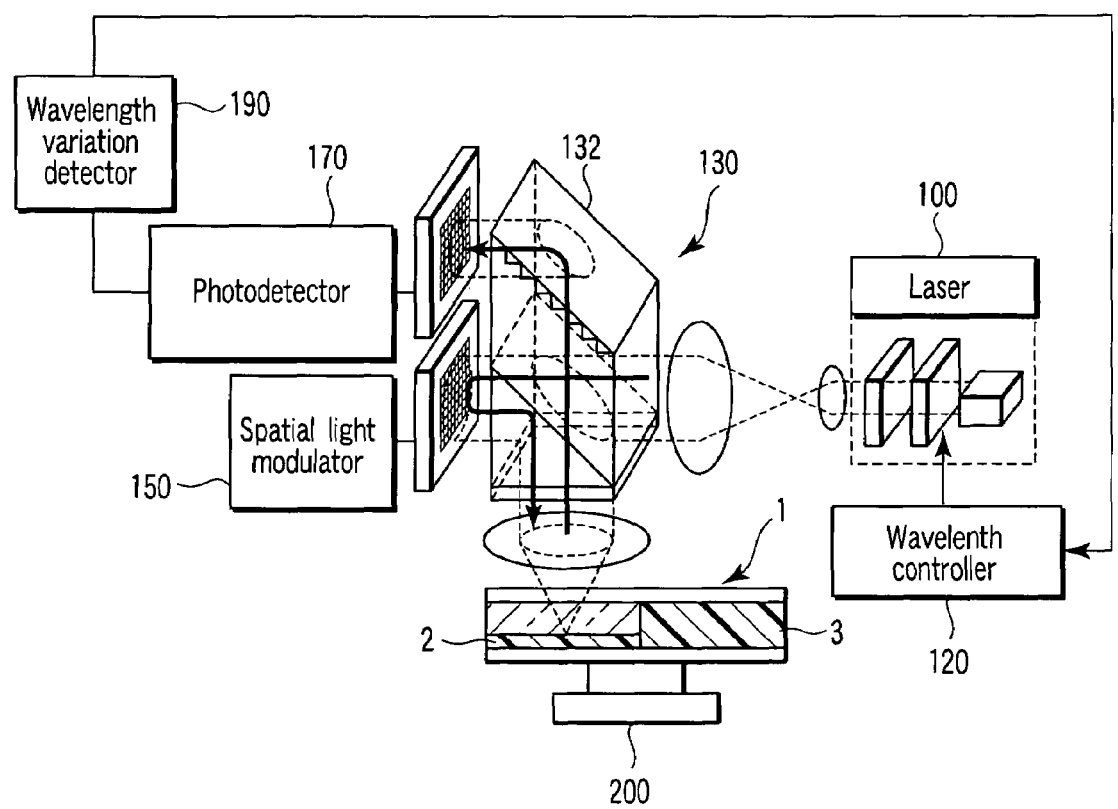
F I G. 26

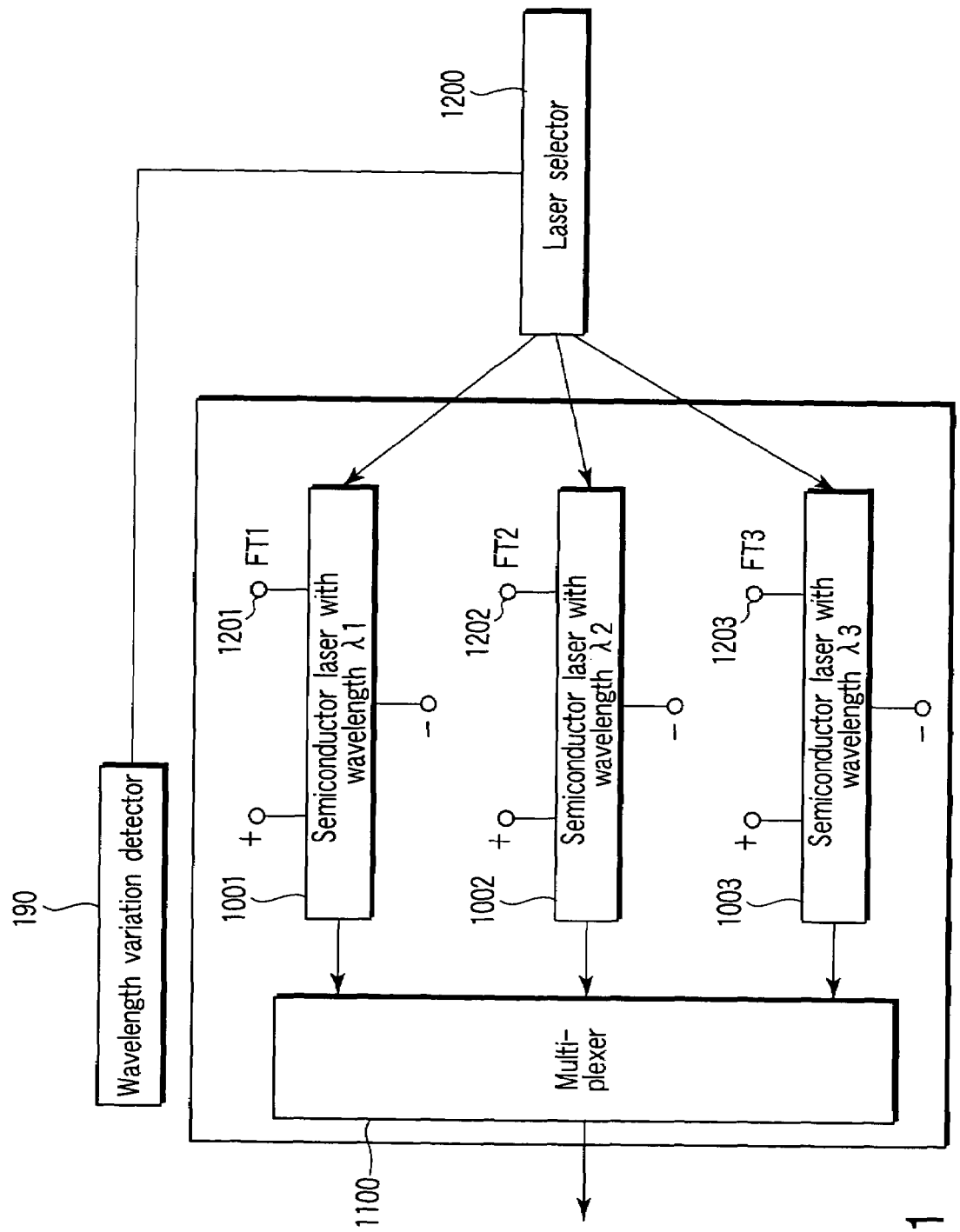
F I G. 31

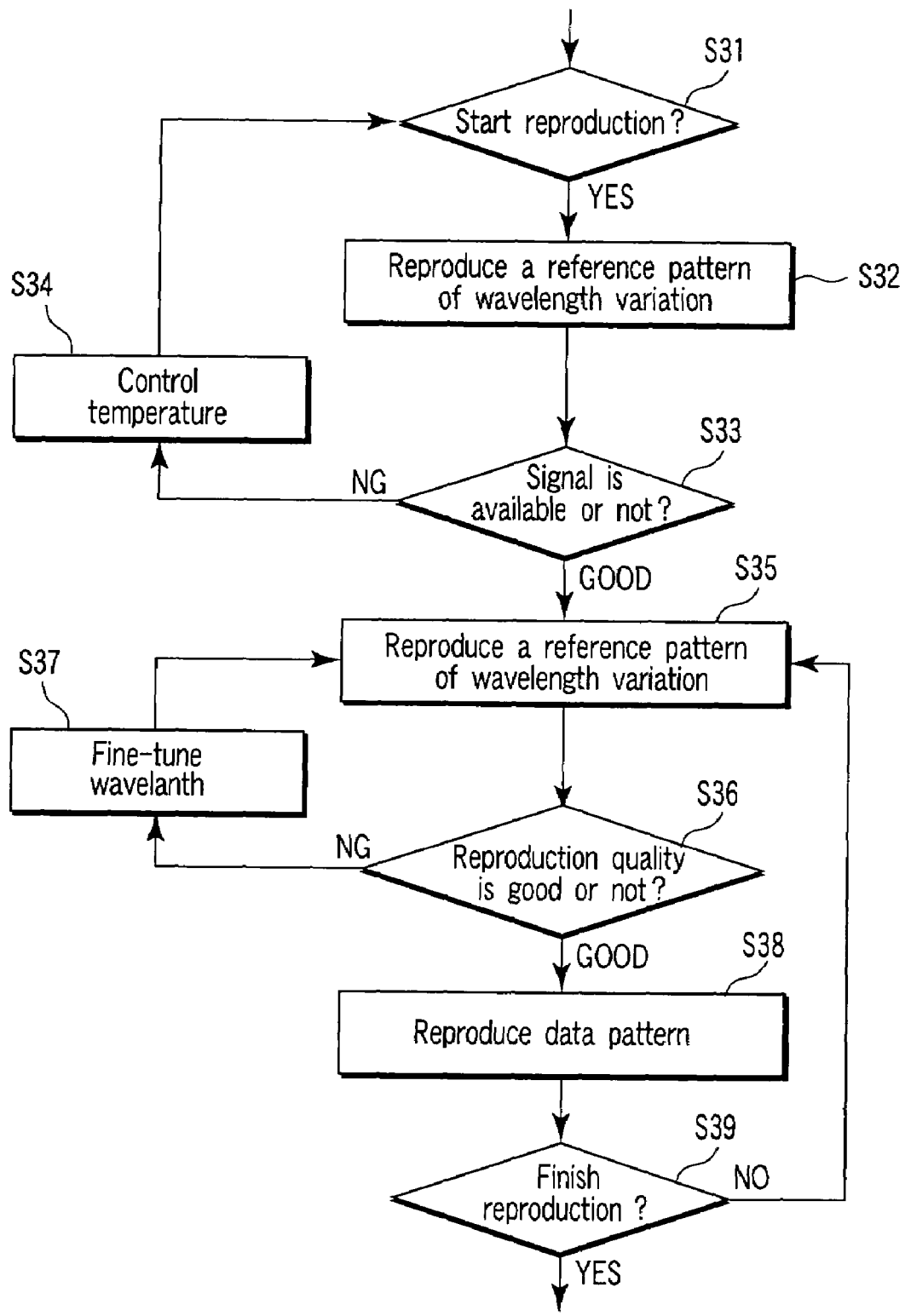
F I G. 34

METHOD OF HOLOGRAPHIC RECORDING AND REPRODUCTION, HOLOGRAPHIC RECORDING MEDIUM AND HOLOGRAPHIC RECORDING AND REPRODUCING APPARATUS

CROSS-REFERENCE TO RELATED APPLICATIONS

This application is based upon and claims the benefit of priority from prior Japanese Patent Application No. 2005-088199, filed Mar. 25, 2005, the entire contents of which are incorporated herein by reference.

BACKGROUND OF THE INVENTION

1. Field of the Invention

The present invention relates to a method of holographic recording and reproduction, a holographic recording medium and a holographic recording and reproducing apparatus.

2. Description of the Related Art

Holographic storage allows storing data at far higher density compared to planar recording such as conventional magneto-optical recording or phase-change optical recording. Thus, the holographic storage has been proposed as an optical recording system that can achieve high capacity and high-speed transfer, and has been developed actively (see, for example, H. J. Coufal, Holographic Data Storage (Springer, Berlin, 2000), page 3).

Holographic storage is a technique to record information to a recording medium using holography in which an information beam carrying image information is superimposed with a reference beam inside the recording medium and an interference pattern generated in the operation is written to the recording medium. The recorded information is read out by irradiating the recording medium with the reference beam and picking up the image information based on diffraction from the interference pattern.

Because the interference pattern is written three-dimensionally in the holographic storage making use of a thickness of the recording medium, high selectivity in light wavelength and angle is attained, which enables multiplexing, and therefore, high recording capacity can be achieved. In addition, since the image information can be read out at once, holographic storage provides an advantage of high transfer speed of reconstruction signals.

The image information to be recorded is generally generated by encoding digital information. In reproduction, the recorded image information is read out, decoded, and extracted as information.

In recent years, reflection collinear holographic storage has been proposed as a novel recording system with remarkably increased practicability compared to conventional transmission holographic storage (see, for example, Jpn. Pat. Appln. KOKAI Publication No. 2002-123949). This system uses a recording medium having a recording layer on the front side and a reflection layer on the rear surface in which recording is performed by irradiating the recording layer with a reference beam and an information beam on a coaxial optical path. Since this system allows performing input and output of information in the same direction and on the same axis with respect to the medium, a pickup can be easily mechanical-controlled. In addition, because address information of the recording medium can be read out under tracking and servo based on information pre-formatted on the medium, random access is enabled. Furthermore, since recording and reproduction are performed by irradiating the medium with spherical waves focused by a lens, reproduction can be advantageously performed even if the medium in a disk is tilted.

In the above-mentioned holographic storage of the transmission system, reflection collinear system, or advanced collinear system, it is assumed that a laser diode is used as a light source to record and reproduce the hologram. Because of a small size and low power consumption, the laser diode has already been used in recording and reproduction apparatuses for various optical recording media such as CD-ROM and DVD, and is also a promising candidate for a light source for holographic recording and reproduction apparatuses. However, the laser diode has problems that must be solved when used in the holographic recording and reproduction.

It is known that laser diodes have individual difference in emission wavelength. The individual difference means that, even if the lasers are designed to emit light of a specific wavelength, emission wavelengths thereof may vary from several nanometers to ten nanometers depending on individual lasers due to slight variations in material compositions, thicknesses of respective layers, or the like. In order to manufacture laser diode free of wavelength variation, manufacturing conditions must be stringently controlled, resulting in poor yield and increased manufacturing cost.

In reproducing information recorded as the hologram, it is necessary to read the information using a reproducing beam of the same wavelength as that of the recording beam. However, under the circumstances that the laser diode may have a wavelength variation, there may be a case where reproduction cannot be successfully achieved when the hologram is to be reproduced with an apparatus other than that apparatus used in recording. Specifically, the wavelength variation in the reproducing beam brings about lowering in the signal-to-noise ratio because reconstruction beam intensity is reduced due to decrease in diffraction efficiency of the reproducing beam or an outgoing direction of the beam is varied from a designed direction.

The emission wavelength of a laser diode may vary in accordance with an operating temperature or an injection current, and also may vary depending on an elapsed time. In the case where the volume of recording medium is changed, a wavelength suitable to reproduction may differ from that used in recording. Under the circumstances, the SNR may also be lowered so that the reproduction is made difficult even if reproduction is to be performed with the apparatus same as that used in recording.

To these problems, in the transmission holographic storage system, it is proposed to read positional information on the optical detector array of the reconstruction signal and to control the light source wavelength (Jpn. Pat. Appln. KOKAI Publication No. 2002-216359). However, in the reflection collinear or advanced collinear holographic storage system, reproduction becomes markedly difficult as compared to the transmission holographic storage system unless the wavelength variation is controlled more strictly. Therefore, a method capable of detecting the wavelength variation between the recording beam and the reproducing beam more easily is required.

BRIEF SUMMARY OF THE INVENTION

According to an aspect of the present invention, there is provided a method of holographic recording and reproduction, the method comprising: recording to a holographic recording medium a wavelength variation reference pattern as a hologram at a wavelength of a recording beam, the wavelength variation reference pattern allows to determine a wavelength variation between a recording beam and a reproducing beam based on a size of an image reproduced at a wavelength of the reproducing beam; recording to the holographic recording medium a page data pattern as a hologram at the wavelength of the recording beam, the recording beam including an information beam carrying information and a reference beam, the information beam and the reference beam being collinear and generated by spatially modulating a light beam; detecting the wavelength variation between the recording beam and the reproducing beam based on the size of the image for wavelength variation reference obtained by reproducing the wavelength variation reference pattern at the wavelength of the reproducing beam; and reproducing the page data pattern using the reproducing beam, the reproducing beam including a reference beam with a wavelength controlled based on the detected wavelength variation.

According to another aspect of the present invention, there is provided a holographic recording medium, comprising: a substrate having a servo surface; and a holographic recording layer formed on the substrate, the holographic recording layer comprises a first recording zone for a page data pattern and a second recording zone for a wavelength variation reference pattern.

According to still another aspect of the present invention, there is provided a holographic recording and reproducing apparatus by which information is recorded as a hologram to a holographic recording medium, comprising: a light source; a spatial light modulator spatially modulating intensity and/or phase of an optical beam from the light source to generate an information beam, a reference beam, and spots corresponding to a wavelength variation reference pattern; an optical system configured to irradiate the holographic recording medium with the reference beam and the spots corresponding to the wavelength variation reference pattern as a recording beam for wavelength variation reference pattern, with the information beam and the reference beam collinearly as a recording beam, and with only the reference beam as a reproducing beam, respectively; a photo-detector arranged on the same side as the optical system with respect to the holographic recording medium; a wavelength variation detector detecting a wavelength variation of the reproducing beam to the recording beam based on a size of an image for wavelength variation reference obtained by the photo-detector by irradiating the wavelength variation reference pattern recorded to the holographic recording medium with the reproducing beam; and a wavelength controller controlling wavelength of the light source based on a detection result by the wavelength variation detector.

BRIEF DESCRIPTION OF THE SEVERAL VIEWS OF THE DRAWING

FIG. 2 is a diagram showing the optical system included in the pickup of a holographic recording and reproducing apparatus according to an embodiment of the present invention;

FIG. 14 is a plan view showing a wavelength variation reference pattern according to an embodiment of the present invention;

FIG. 15 is a plan view showing a reference pattern according to an embodiment of the present invention;

FIGS. 21A and 21B are diagrams illustrating that conditions in a case where a recording region for the wavelength variation reference pattern is irradiated with the recording beam for wavelength variation reference pattern and in a case where a recording region for the page data pattern is irradiated with recording beam are set to be identical;

FIG. 26 is a diagram schematically showing a holographic recording and reproducing apparatus according to a modified embodiment;

FIG. 31 is a diagram showing a wavelength controller of a holographic recording and reproducing apparatus according to an embodiment of the present invention;

FIG. 34 is a flow chart showing a sequence of reproduction with the holographic recording and reproducing apparatus of FIG. 33.

DETAILED DESCRIPTION OF THE INVENTION

Several basic terms used herein will be described.

The term "hologram" means a transmission grating, a reflection grating, or a complex grating thereof which is produced by recording a change of the degree of light intensity caused by light interference to a recording medium.

The term "holographic recording medium" means a medium to which a change of the degree of light intensity caused by light interference can be recorded as a hologram. The holographic recording medium may have various forms such as a disk, a card, a cubic shape, and an oval shape.

The term "wavelength variation reference pattern" means a pattern recorded as a hologram at a wavelength of a recording beam which allows to determine a wavelength variation between a recording beam and a reproducing beam based on a size of an image thereof reproduced at a wavelength of the reproducing beam (referred to as an image for wavelength variation reference).

Referring to accompanied drawings, an embodiment of the present invention will be described in detail hereinafter.

Figure 1:
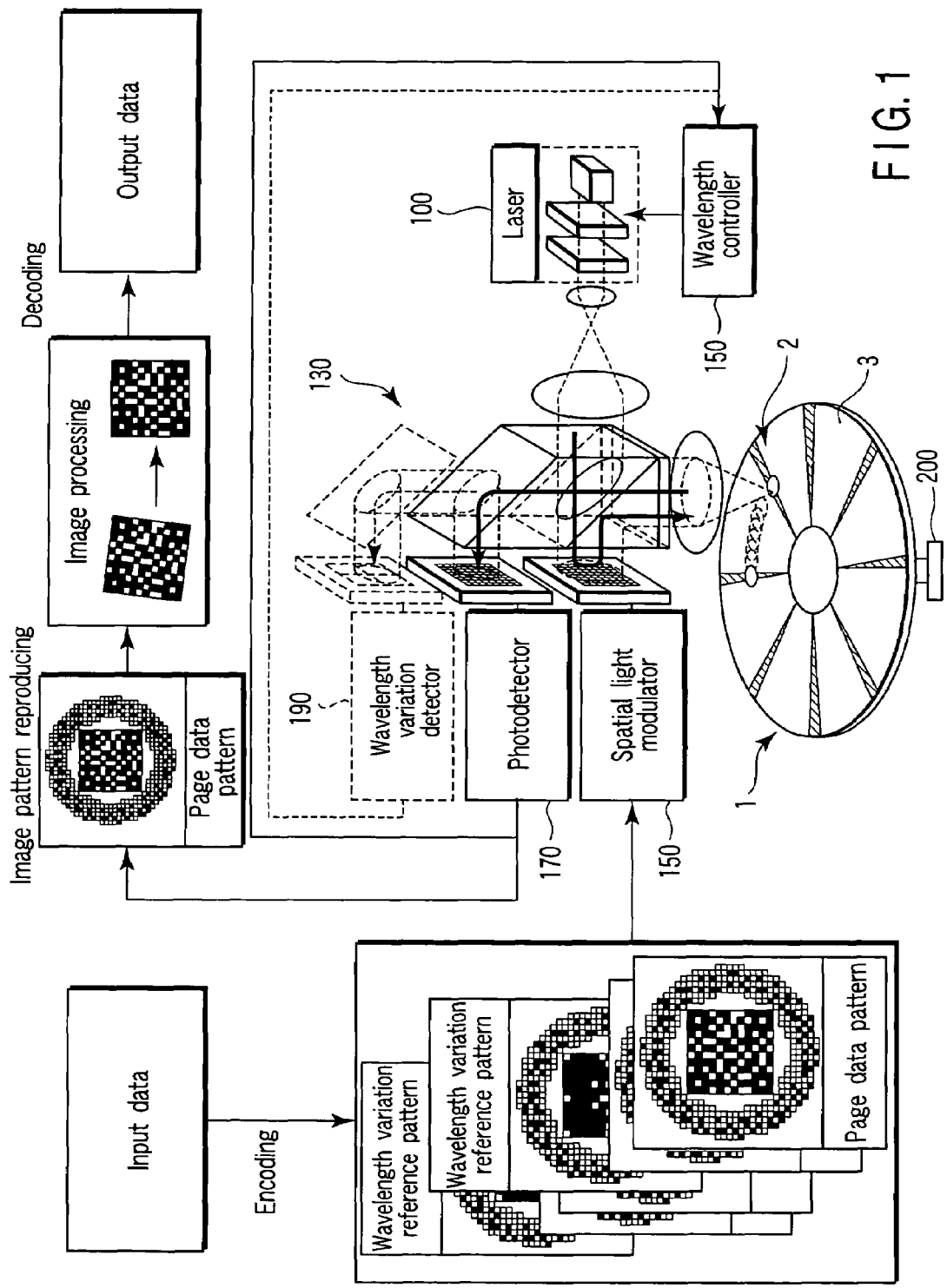
FIG. 1 is a diagram schematically showing a holographic recording and reproducing apparatus of a single-beam reflection collinear system according to an embodiment of the present invention and a method of holographic recording and reproduction using the apparatus.

FIG. 1 is a diagram schematically showing a holographic recording and reproducing apparatus of a single-beam reflection collinear system according to an embodiment of the present invention and a method of holographic recording and reproduction using the apparatus.

As shown in FIG. 1, a disk-shaped holographic recording medium 1 is mounted to a spindle and rotated by a spindle motor 200. The spindle motor 200 is controlled by a spindle servo circuit so as to keep the rotating speed of the holographic recording medium 1 to a predetermined value.

The holographic recording medium 1 includes a first recording zone 3 for a page data pattern and a second recording zone 2 for a wavelength variation reference pattern in the plane thereof. The holographic recording medium 1 may include a header area in addition to these areas. The cross-sectional structure of the holographic recording medium 1 will be described later in detail.

A pickup is arranged on the holographic recording medium 1. The pickup includes a laser 100 as a light source, a wavelength controller 120 for the laser 100, an optical system 130, a spatial light modulator 150 as an input unit, a photo-detector 170 such as a CCD or CMOS array, and a wavelength variation detector 190. FIG. 2 shows the optical system 130 included in the pickup of the holographic recording and reproducing apparatus according to the present embodiment in further detail.

The pickup is adapted to record information by irradiating the holographic recording medium 1 with an information beam and a reference beam and to reproduce information recorded in the holographic recording medium 1 by irradiating the medium with the reference beam and detecting a reconstruction beam. The pickup is made movable in the radial direction of the holographic recording medium 1 by a drive unit.

A detection circuit detects focus error signals, tracking error signals, wavelength error signals, and reconstruction signals from pickup output signals. Based on the focus error signals detected by the detection circuit, a focus servo circuit drives an actuator in the pickup to make an objective lens move in the thickness direction of the holographic recording medium so as to perform focus servo. Based on the tracking error signals detected by the detection circuit, a tracking servo circuit drives an actuator in the pickup to make an objective lens move in the radial direction of the holographic recording medium so as to perform tracking servo. Based on the wavelength error signals, a wavelength control circuit drives the wavelength controller 120 to control the wavelength of the laser 100.

A signal processing circuit decodes output data from the photo-detector 170 in the pickup, thereby reproducing the data recorded in the first recording zone 3 for the page data pattern of the holographic recording medium 1, outputting the reference clock, and detecting an address. The whole holographic recording and reproducing apparatus is controlled by a controller to which various instructions are transmitted from a console. The controller inputs the reference clock and the address data output from the signal processing circuit, and controls the pickup, a spindle servo circuit and a slide servo circuit. The spindle servo circuit inputs the reference clock output from the signal processing circuit. The controller includes a central processing unit (CPU), a read only memory (ROM), and a random access memory (RAM). The CPU achieves functions of the controller by executing programs stored in ROM with RAM used as a work space.

Figure 3A:
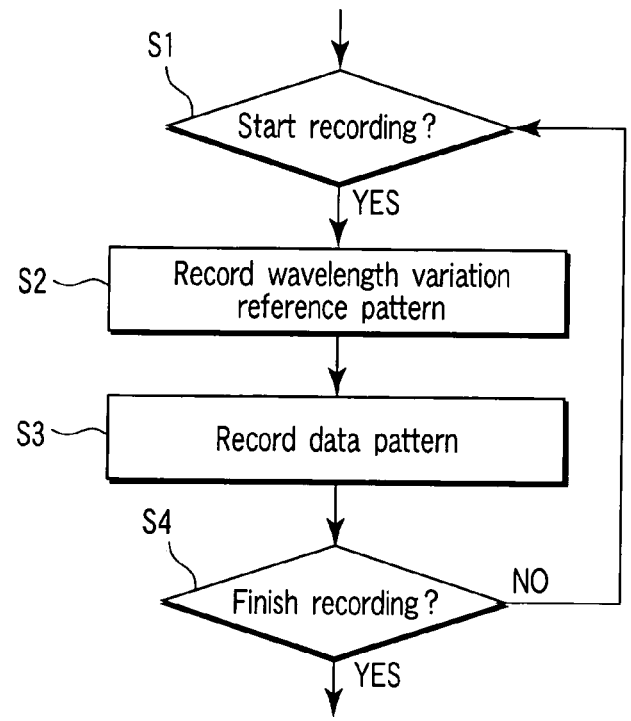
FIGS. 3A and 3B are flow charts showing a sequence of recording and a sequence of reproduction in an embodiment of the present invention, respectively.
Figure 3B:
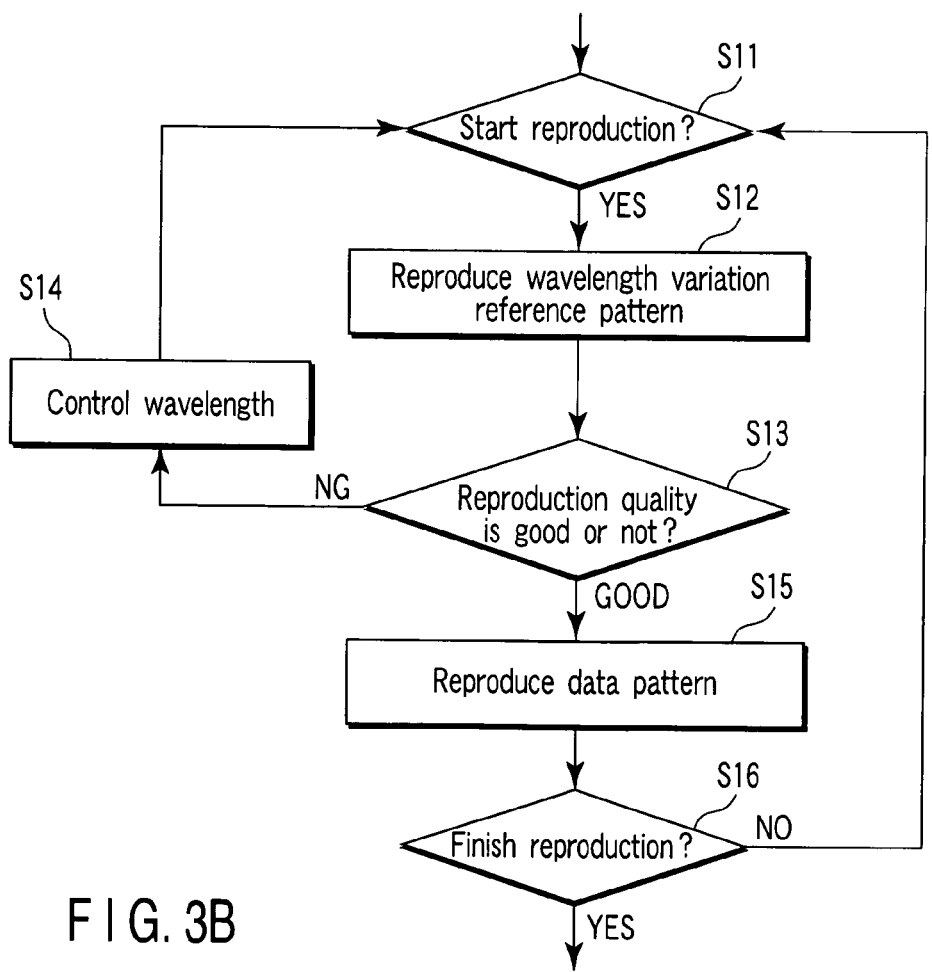

FIG. 3A is a flow chart showing a sequence of recording. FIG. 3B is a flow chart showing a sequence of reproduction.

As shown in FIG. 3A, recording is started (S1), the wavelength variation reference pattern is recorded (S2), and the page data pattern is recorded (S3). Thereafter, whether the recording is finished is determined (S4).

As shown in FIG. 3B, reproduction is started (S11), the wavelength variation reference pattern is reproduced (S12), the reproduction quality is determined (S13), and if the reproduction quality is unsatisfactory, the wavelength is controlled (S14). Alternatively, the wavelength variation reference pattern is reproduced (S12), the reproduction quality is determined (S13), and if the reproduction quality is satisfactory, the page data pattern is reproduced (S15). Thereafter, whether the reproduction is finished is determined (S16). In this way, in the embodiment of the present invention, the wavelength variation reference pattern is reproduced, and the wavelength is controlled, if necessary, and then the page data pattern is reproduced.

Figure 4:
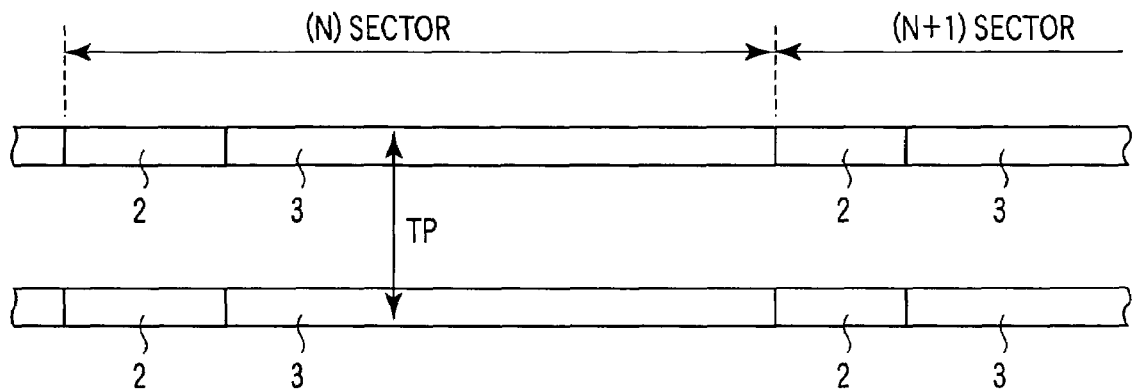
FIG. 4 is a plan view showing a sector structure of a holographic recording medium according to an embodiment of the present invention.
Figure 5:
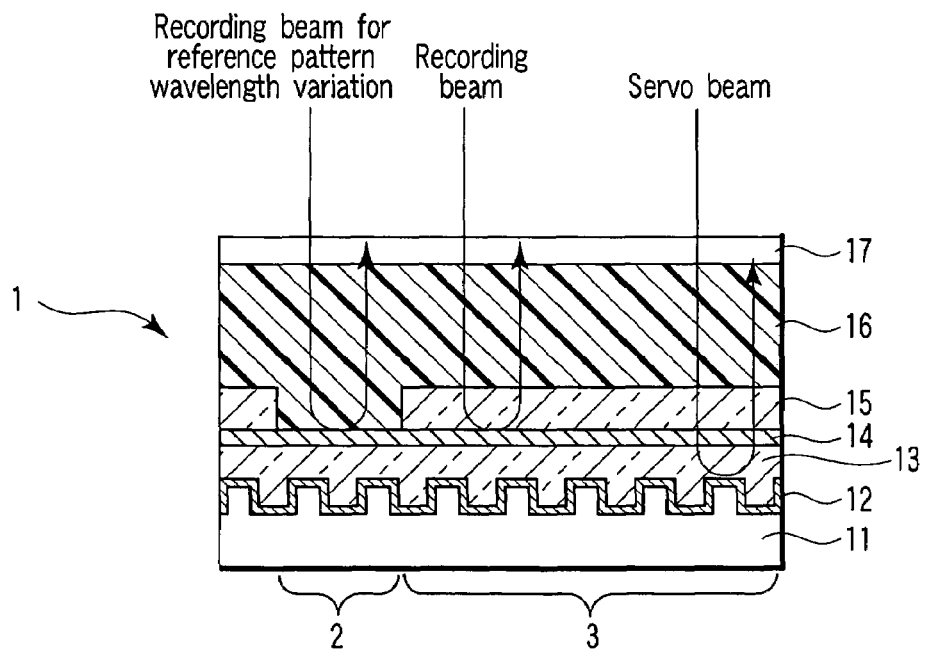
FIG. 5 is a cross-sectional view showing a holographic recording medium according to an embodiment of the present invention.
Figure 6:
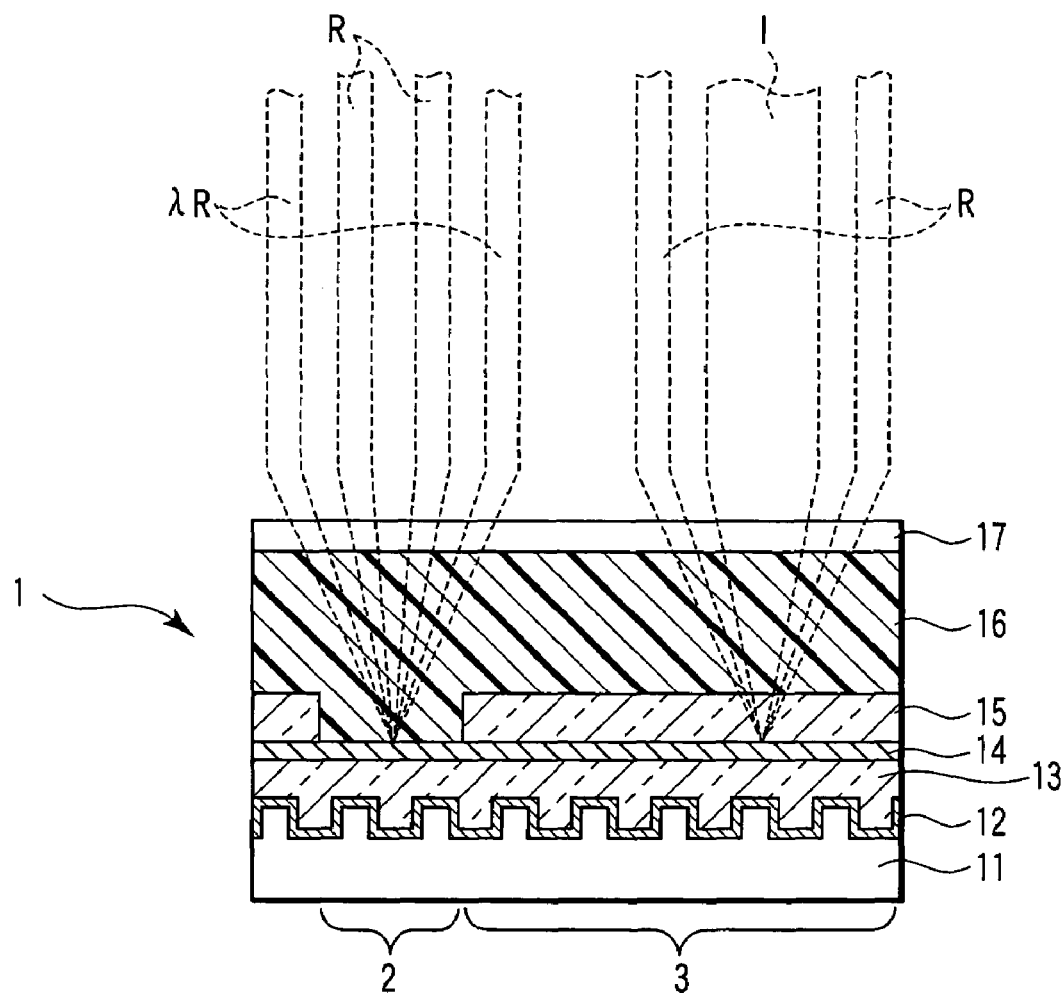
FIG. 6 is a view showing a recording beam for wavelength reference pattern and a recording beam applied to a holographic recording medium according to an embodiment of the present invention.

FIG. 4 is a plan view showing a sector structure of a holographic recording medium according to an embodiment of the present invention. FIG. 5 is a cross-sectional view showing a holographic recording medium according to an embodiment of the present invention. FIG. 6 is a view showing a recording beam for wavelength reference pattern and a recording beam applied to a holographic recording medium according to an embodiment of the present invention.

As shown in the plan view of FIG. 4, the holographic recording medium includes tracks apart from each other with a track pitch TP. One track is constituted by sectors. One sector is constituted by the first recording zone for the page data pattern 3 and the second recording zone 2 for the wavelength variation reference pattern. The second recording zone 2 for the wavelength variation reference pattern may be provided in a ratio of one every several sectors or may be provided at a specific region of the medium, for example, in the central region or the peripheral region.

Referring to FIGS. 5 and 6, the cross-sectional structure of the holographic recording medium according to the present embodiment will be described. The disk-shaped substrate 11 made of, for example, approximately 0.6 mm-thick polycarbonate has one surface with lands and grooves, on which surface a reflection layer 12 made of, for example, aluminum is formed. On the surface of the substrate 11 with lands and grooves, address data of the wavelength variation reference pattern recording zone 2 and the page data pattern recording zone 3 are recorded as, for example, embossed pits. The surface with lands and grooves is used as a servo surface, where the reflection layer 12 is irradiated with a servo beam for focus servo (see FIG. 5). In order to perform tracking servo, for example, wobbled pits are used. On the reflection layer 12, a lower gap layer 13, a wavelength selection layer (or a dichroic mirror layer) 14, an upper gap layer 15, a holographic recording layer 16, and a protection substrate 17 are formed.

The gap layer is formed of a material having a refractive index close to that of the holographic recording layer 16 and transparent to the recording beam. The gap layer is preferred to have less birefringence.

The wavelength selection layer (or dichroic mirror layer) 14 transmits a servo beam with a wavelength of, for example, 650 nm, and reflects the recording beam and the reproducing beam with a wavelength of, for example, 405 nm.

The upper gap layer 15 is provided to realize recording that makes the best use of recording characteristics of the holographic recording layer 16. In FIGS. 5 and 6, the upper gap layer 15 is formed only in the first recording zone 3 for the page data pattern and is removed in the second recording zone 2 for the wavelength variation reference pattern. Therefore, the thickness (second thickness) of the holographic recording layer 16 in the second recording zone 2 for the wavelength variation reference pattern is greater than the thickness (first thickness) of the holographic recording layer 16 in the first recording zone 3 for the page data pattern.

In the second recording zone 2 for the wavelength variation reference pattern, an upper gap layer 15 may be provided in the same manner as in the first recording zone 3 for the page data pattern. Whether or not the upper gap layer is provided in the second recording zone 2 for the wavelength variation reference pattern depends on the wavelength variation reference pattern to be recorded.

The holographic recording layer 16 is formed of a holographic recording material, such as a photopolymer, whose optical characteristics such as a refractive index, a dielectric constant, a reflectance, and a transmittance vary in accordance with light intensity when the material is irradiated with light. The holographic recording layer 16 is set to a suitable thickness, for example, 100 μm or more. Information is recorded to the holographic recording layer 16 by making use of holography. The wavelength variation reference pattern is recorded in the second recording zone 2 for the wavelength variation reference pattern, and the page data pattern is recorded in the first recording zone 3 for the page data pattern, respectively. Incidentally, the interface between the protection substrate 17 and the holographic recording layer 16 may be used as the servo surface.

Next, referring to other drawings, a holographic recording medium according to other embodiments of the present invention will be described. In these drawings, the substrate 11 is simplified. More specifically, the lands and grooves on the surface of substrate 11 and the reflection layer, lower gap layer, and wavelength selection layer stacked on the substrate 11 are not shown.

Figure 7:
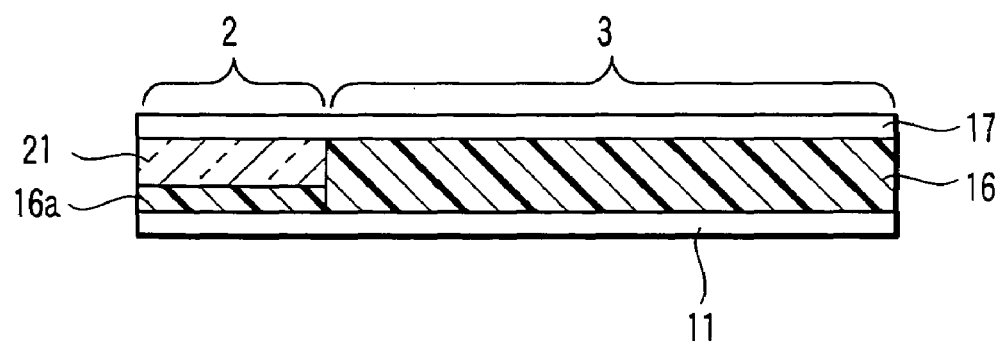
FIG. 7 is a cross-sectional view showing a holographic recording medium according to another embodiment of the present invention.

FIG. 7 is a cross-sectional view showing a holographic recording medium according to another embodiment of the present invention. In the holographic recording medium shown in FIG. 7, only a comparatively thick holographic recording layer 16 with a third thickness is stacked on the substrate 11 in the first recording zone 3 for the page data pattern, and a comparatively thin holographic recording layer 16a with a fourth thickness and a step compensation layer 21 are stacked on the substrate 11 in the second recording zone 2 for the wavelength variation reference pattern, respectively. The thickness of the holographic recording layer 16 in the first recording zone 3 for the page data pattern is set to be nearly same as the total thickness of the holographic recording layer 16a and the step compensation layer 21 in the recording region 2 for the wavelength variation reference pattern. Further, a protection substrate 17 is provided on the surface thereof.

Figure 8:
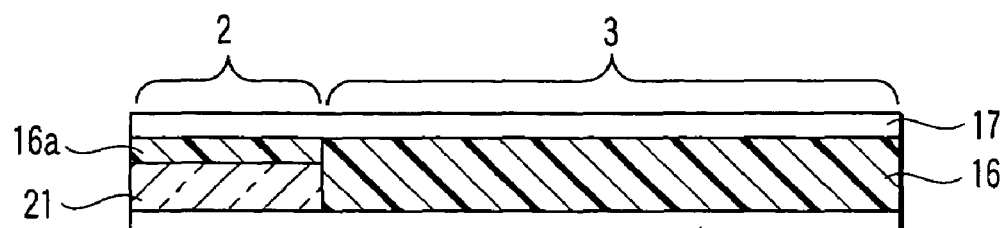
FIG. 8 is a cross-sectional view showing a holographic recording medium according to a modified embodiment of FIG. 7.

FIG. 8 is a cross-sectional view showing a holographic recording medium according to a modified embodiment of FIG. 7. In the holographic recording medium shown in FIG. 8, the stacking order of the step compensation layer 21 and the holographic recording layer 16a in the second recording zone 2 for the wavelength variation reference pattern 2 is reversed to that of FIG. 7.

Figure 9:
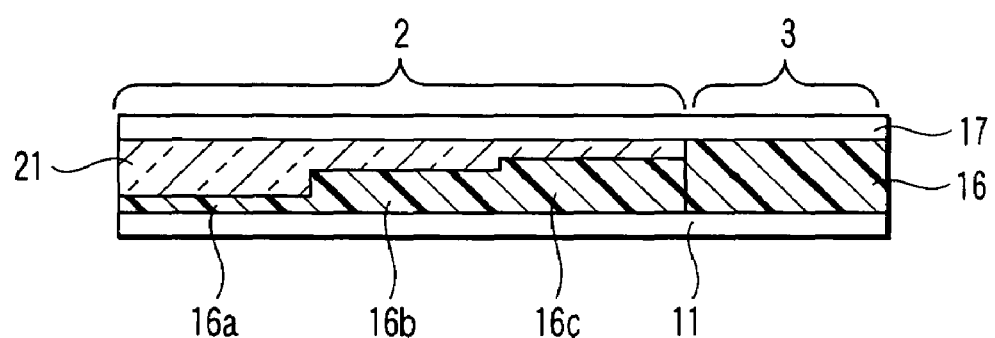
FIG. 9 is a cross-sectional view showing a holographic recording medium according to another modified embodiment of FIG. 7.

FIG. 9 is a cross-sectional view showing a holographic recording medium according to another modified embodiment of FIG. 7. Also in the holographic recording medium shown in FIG. 9, a holographic recording layer and a step compensation layer are stacked on the substrate in the second recording zone 2 for the wavelength variation reference pattern. In FIG. 9, the second recording zone 2 for the wavelength variation reference pattern is subdivided into three regions, in which the more distant from the first recording zone 3 for the page data pattern, the smaller is the holographic recording layer 16a, and the thicknesses of the holographic recording layers 16b and 16c gradually increases as the holographic recording layer 16 is closer to the first recording zone 3 for the page data pattern. On these holographic recording layers 16a, 16b, 16c, the step compensation layer 21 is formed in such a manner that the thickness thereof gradually decreases. In this way, the thickness of the holographic recording layer 16 in the recording region 3 for the page data pattern is set to be nearly same as the total thickness of the holographic recording layer and the step compensation layer 21 in the entire regions of the second recording zone 2 for the wavelength variation reference pattern.

In FIGS. 7, 8, and 9, the thickness (fourth thickness) of the holographic recording layer of the second recording zone 2 for the wavelength variation reference pattern is smaller than the thickness (third thickness) of the holographic recording layer in the first recording zone 3 for the page data pattern. In general, in a case where a hologram recorded with a recording beam of a certain wavelength is reproduced by irradiating with a reference beam with a wavelength different from that of the recording beam, the intensity of the reconstruction beam lowers as well as the outgoing angle thereof from the recording medium 1 deviates. In the method according to embodiments of the present invention, a variation in the size of an image for wavelength variation reference due to these factors is detected, by which whether the wavelength is varied on the shorter wavelength side or longer wavelength side is judged. However, in the case where the thickness of the holographic recording layer is too great, the intensity of the reconstruction beam markedly lowers if the wavelength of the reproducing beam deviates only slightly from the wavelength of the recording beam, and thus, the reconstruction beam is hardly detected by the photo-detector and the deviation direction of the wavelength variation cannot be identified. It has been found that the smaller the thickness of a holographic recording layer, the wider the range in which sufficient beam intensity can be detected even if any wavelength variation occurs. Therefore, by reducing the thickness of the holographic recording layer in the second recording zone 2 for the wavelength variation reference pattern compared to that in the first recording zone 3 for the page data pattern, it would be possible to increase the range of wavelength variation that can be detected based on the size of the image for wavelength variation reference obtained from the wavelength variation reference pattern.

Figure 10:
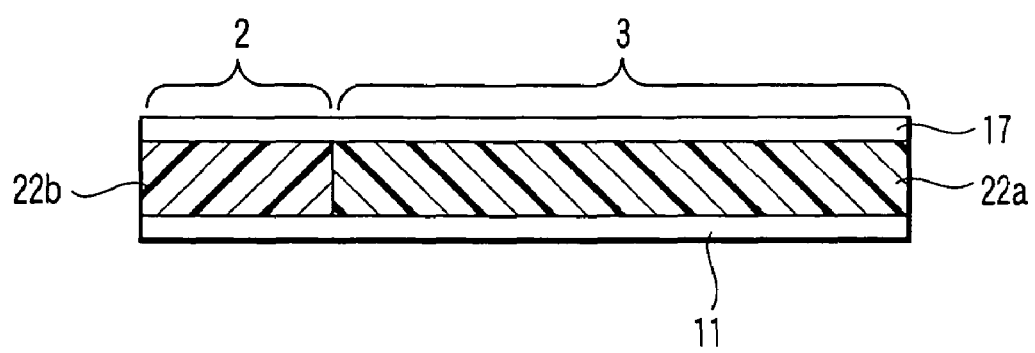
FIG. 10 is a cross-sectional view showing a holographic recording medium according to still another embodiment of the present invention.

FIG. 10 is a cross-sectional view showing a holographic recording medium according to still another embodiment of the present invention. In the holographic recording medium shown in FIG. 10, a first holographic recording layer 22a with a first refractive index is formed on the substrate 11 in the first recording zone 3 for the page data pattern, and a second holographic recording layer 22b with a second refractive index larger than the first refractive index is formed on the substrate 11 in the second recording zone 2 for the wavelength variation reference pattern. The thickness of the first holographic recording layer 22a in the first recording zone 3 for the page data pattern is set to be substantially the same as the thickness of the holographic recording layer 22b in the second recording zone 3 for the wavelength variation reference pattern. Further, a protection substrate 17 is provided on the surface thereof.

Figure 11:
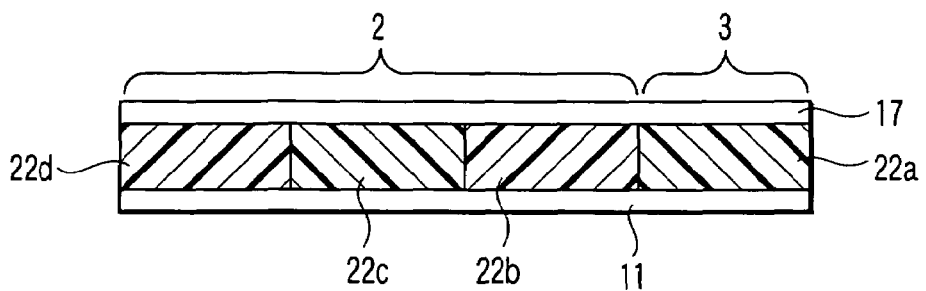
FIG. 11 is a cross-sectional view showing a holographic recording medium according to a modified embodiment of FIG. 10.

FIG. 11 is a cross-sectional view of a holographic recording medium according to a modified embodiment of FIG. 10. In the holographic recording medium shown in FIG. 11, the second recording zone 2 for the wavelength variation reference pattern is subdivided into three regions, and a second holographic recording layer 22b, a third holographic recording layer 22c, and a fourth holographic recording layer 23d are formed in the order of locations closer to the first recording zone 3 for the page data pattern on the substrate 11. In the first to fourth holographic recording layers 22a to 22d, the refractive index gradually increases. The thickness of the first holographic recording layer 22a in the first recording zone 3 for the page data pattern and the thicknesses of the second to fourth holographic recording layers 22b, 22c and 22d in the entire region of the second recording zone 2 for the wavelength variation reference pattern are set to be substantially the same.

In FIGS. 10 and 11, the holographic recording layer in the second recording zone 2 for the wavelength variation reference pattern has a greater refractive index than the holographic recording layer in the first recording zone 3 for the page data pattern. It has been found that the range in which sufficient beam intensity can be detected even if any wavelength variation occurs is also related to the refractive index of the holographic recording layer, and that the greater the refractive index, the wider the range. Therefore, by making the refractive index of the holographic recording layer in the second recording zone 2 for the wavelength variation reference pattern smaller than that of the holographic recording layer in the first recording zone 3 for the page data pattern 3 as described above, it would be possible to increase the range of wavelength variation that can be detected based on the size of the image for wavelength variation reference obtained from the wavelength variation reference pattern.

Figure 12:
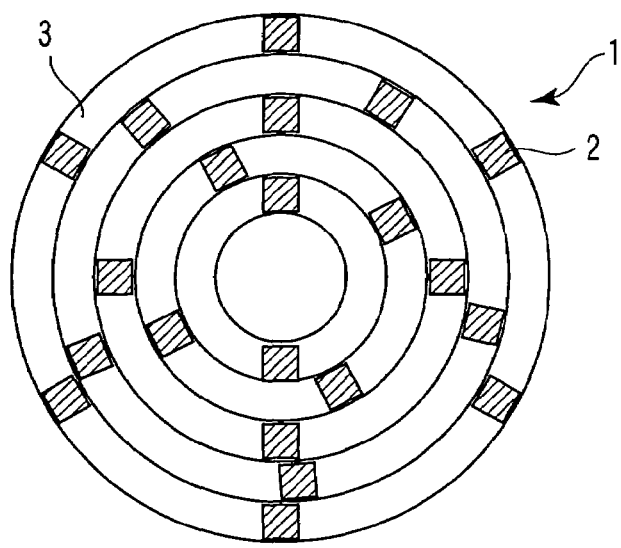
FIG. 12 is a plan view of a holographic recording medium according to another embodiment of the present invention.

FIG. 12 is a plan view showing a holographic recording medium according to another embodiment of the present invention. The holographic recording medium 1 also includes a first recording zone 3 for a page data pattern and a second recording zone 2 for a wavelength variation reference pattern in the plane thereof. In the holographic recording medium shown in FIG. 12, the second recording zone 2 for the wavelength variation reference pattern is arranged in such a manner that the second recording zone 2 is provided in a predetermined ratio to the second recording zones 3 for the page data pattern.

Referring now to FIGS. 1 and 2 and other drawings, a holographic recording and reproducing apparatus and a recording and reproducing method using the apparatus according to an embodiment of the present invention will be described in further detail.

First, recording will be described. Digital input data to be recorded is encoded into a page data pattern which is a two-dimensional image data and displayed on the spatial light modulator 150. The spatial light modulator 150 has pixels arranged in a two-dimensional lattice, and can generate simultaneously an information beam and a reference beam as a two-dimensional pattern by varying the outgoing direction of the reflected light for each pixel or varying the polarization direction of the reflected light for each pixel. As the spatial light modulator 150, a reflective liquid crystal element, a digital mirror device, or a reflective modulator element utilizing a magneto-optical effect can be used.

Figure 13:
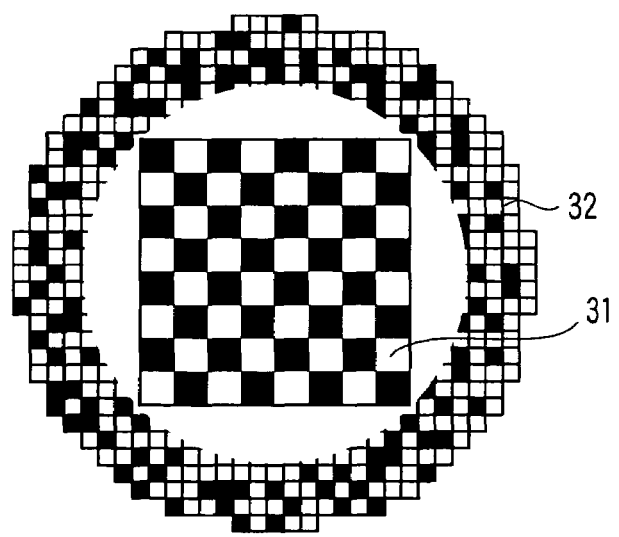
FIG. 13 is a plan view showing a page data pattern according to an embodiment of the present invention.

As shown in FIG. 13, the page data pattern includes an information beam section 31 in the central region and an annular reference beam section 32 in the peripheral region surrounding the central region. As shown in FIGS. 5 and 6, the recording beam including the information beam (I) and reference beam (R) is applied to the first recording zone 3 for the page data pattern. In embodiments of the present invention, there is no need to correct the laser wavelength in recording.

In the method according to embodiments of the present invention, in addition to the page data pattern, a wavelength variation reference pattern is used to detect a wavelength variation of the reproducing beam to the recording beam. In recording the wavelength variation reference pattern, like the case of the page data pattern, the wavelength variation reference pattern is displayed on the spatial light modulator 150. As shown in FIG. 14, the wavelength variation reference pattern in the present embodiment has a pattern in which spots 33 are arranged around the reference beam section 32. As shown in FIGS. 5 and 6, the recording beam for the wavelength variation reference pattern including the reference beam (R) and spots ($\lambda R$) on the periphery is applied to the second recording zone 2 for the wavelength variation reference pattern 2.

As shown in FIG. 2, a laser diode 101 with a wavelength of, for example, 405 nm is used as a light source for recording and reproduction, and a laser diode 102 with a wavelength of, for example, 650 nm is used as a light source for servo. These laser diodes may be made monochromatic by providing an external resonator or incorporating a distributed feedback (DFB) structure, or may not be provided with any of these means to ensure high power.

Figure 16:
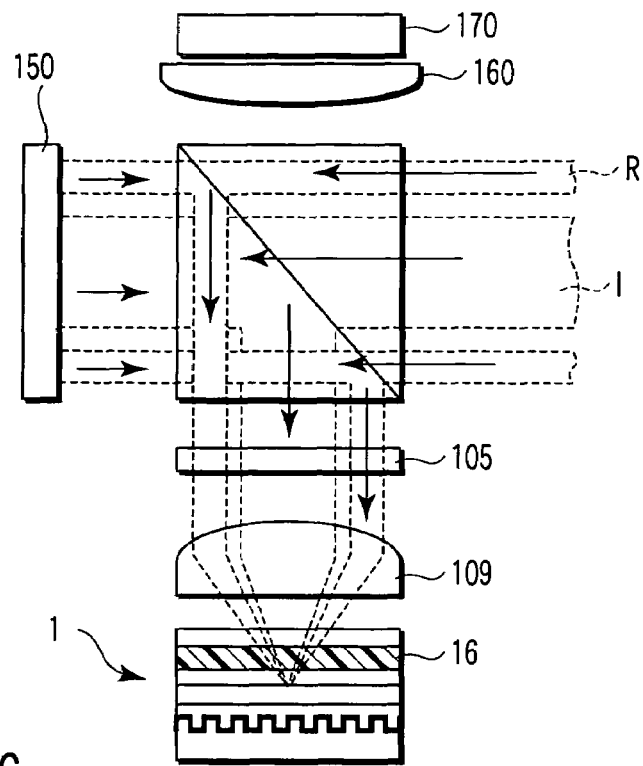
FIG. 16 is a diagram showing a state that a medium is irradiated with a recording beam including an information beam and a reference beam.

The beam emitted from the laser diode 101 for recording and reproduction is collimated through a collimator lens 103, passes a 405-nm polarization beam splitter (PBS) 104, reaches the spatial light modulator 150 and is spatially modulated. When a page data pattern is displayed on the spatial light modulator 150, a recording beam including an information beam and a reference beam is generated. When a wavelength variation reference pattern is displayed on the spatial light modulator 150, a recording beam for wavelength variation reference pattern including a reference beam and spots arranged around the reference beam is generated. During the above processes, a p-polarized beam turns to an s-polarized beam. The s-polarized beam is reflected by PBS 104, passes 405-nm quarter-wave plate 105 into a circularly polarized beam, and reaches the dichroic prism 106. The dichroic prism 106 transmits 405-nm beam and reflects 650-nm beam. The circularly polarized beam having passed the dichroic prism 106 passes lenses 107, 108, 109 and is applied to the first recording zone 3 for the page data pattern of medium 1. As a result, an interference pattern generated by superimposing the information beam with the reference beam is written in the holographic recording layer 16. FIG. 16 shows a state that the medium 1 is irradiated with the recording beam including the information beam (I) and the reference beam.

Figure 20A:
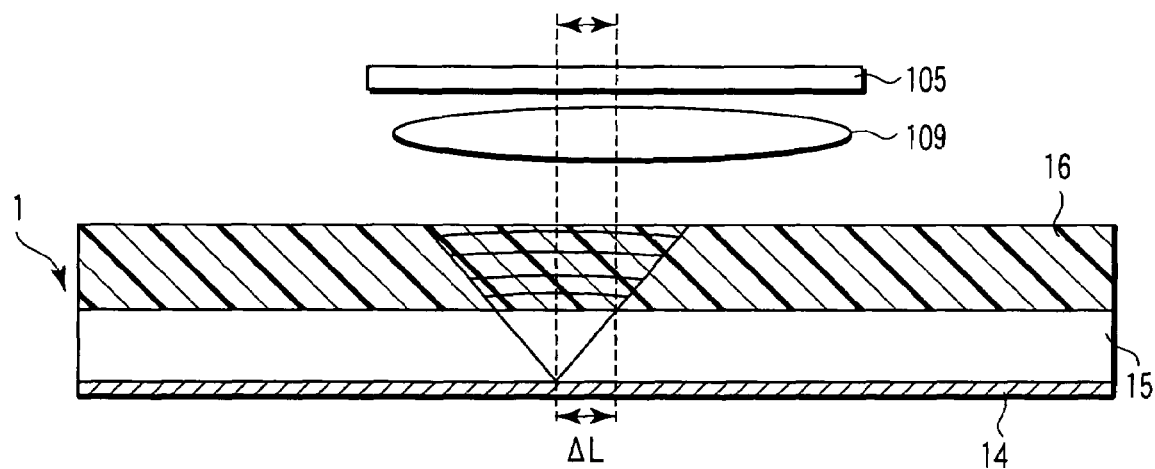
FIGS. 20A and 20B are views showing recording according to shift multiplexing.
Figure 20B:
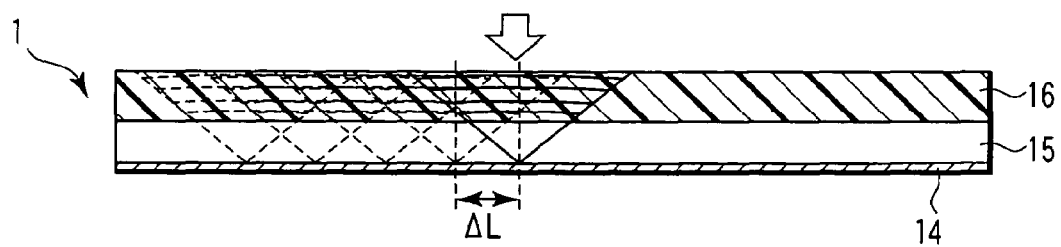

The page data pattern is recorded in shift multiplexing as shown in, for example, FIGS. 20A and 20B. In these drawings, the shift amount is denoted by ΔL.

Figure 17:
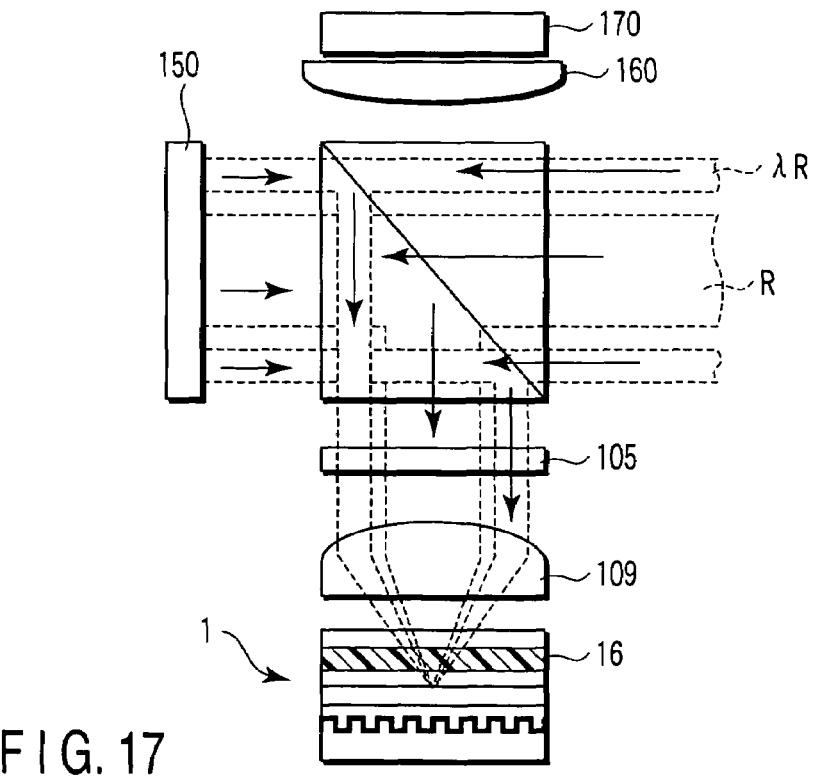
FIG. 17 is a diagram showing a state that a medium is irradiated with a recording beam for wavelength variation reference pattern including a reference beam and spots around thereof.

Similarly, the recording beam for the wavelength variation reference pattern is applied to the second recording zone 2 for the wavelength variation reference pattern of the medium 1, and an interference pattern is recorded in the holographic recording layer 16. FIG. 17 shows a state that the medium 1 is irradiated with the recording beam for wavelength variation reference pattern including the reference beam (R) and the spots (λR) around the reference beam.

The wavelength variation reference pattern needs not to be recorded in shift multiplexing as is the case of the page data pattern. Therefore, as shown in FIGS. 5 and 6, no upper gap layer 15 has to be provided in the second recording zone 2 for the wavelength variation reference pattern of the medium 1.

Incidentally, same conditions including a beam incident angle or the like should be set in the case where the second recording region 2 for the wavelength variation reference pattern is irradiated with the recording beam for wavelength variation reference pattern (FIG. 21A) and in the case where the first recording region 3 for the page data pattern is irradiated with the recording beam (FIG. 21B).

The sequential order to record these patterns may be an order to first record the wavelength variation reference pattern and then record the page data pattern or may be the reverse order.

Next, reproduction will be described. As shown in FIG. 15, the reference beam section 32 of the wavelength variation reference pattern is displayed on the reflective spatial light modulator 150. As is the case of recording, the beam emitted from the laser diode 101 is applied to the second recording zone 2 for the wavelength variation reference pattern of the medium 1. The beam is diffracted by the recorded hologram, returns to the lenses 109, 108, 107, and passes the dichroic prism 106 and the quarter-wave plate 105. Because the beam returned from the medium 1 is a circularly polarized beam which rotates in the opposite direction to that in recording, the beam turns to a p-polarized beam when passed the quarter-wave plate 105. The p-polarized beam passes PBS 104 and reaches the photo-detector 170.

Figure 18:
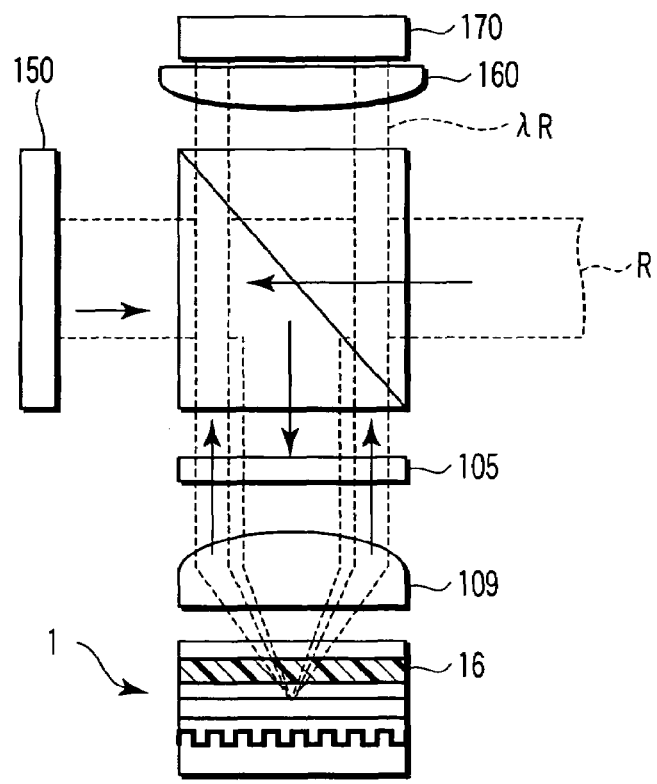
FIG. 18 is a diagram showing a state that the spots of the wavelength variation reference pattern are reproduced.
Figure 22:
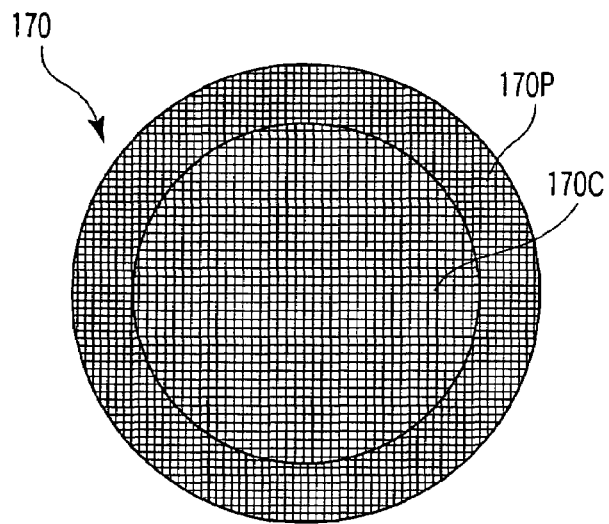
FIG. 22 is a plan view showing the size of pixels of a photo-detector.

The photo-detector 170 is formed of a photo-detector such as CMOS and CCD in which a large number of pixels are arranged in a matrix. FIG. 18 shows a state that the spots (λR) of the wavelength variation reference pattern are reproduced. As shown in FIG. 18, the image of the wavelength variation reference pattern is detected in the peripheral region of the photo-detector 170. Therefore, use of a photo-detector 170 including pixels 170P in the peripheral region and pixels 170C in the central region 170C in which the size of the pixels 170P is smaller than that of the pixels 170C, as shown in FIG. 22, allows to advantageously detect the spots (λR) of wavelength variation reference pattern.

When the wavelength of the reproducing beam is varied from that of the recording beam, the size and the position of the image for wavelength variation reference projected on the photo-detector 170 are changed. As described in detail later, in the case where the reproducing beam has a shorter wavelength compared to the recording beam, the image for wavelength variation reference is contracted and sifts close to the central region, while in the case where the reproducing beam has a longer wavelength compared to that of the recording beam, the image for the wavelength variation reference is expanded and sifts remote from the central region. The wavelength variation detector 190 shown in FIG. 1 detects the wavelength variation of the reproducing beam. Based on the detection result, a signal is sent to the wavelength controller 120 so as to control the laser 100 so that the wavelength of the reproducing beam approaches that of the recording beam.

Repeating the wavelength control of the light source through a series of operations described above makes it possible for the wavelength of the reproducing beam to approach closer to that of the recording beam.

Figure 19:
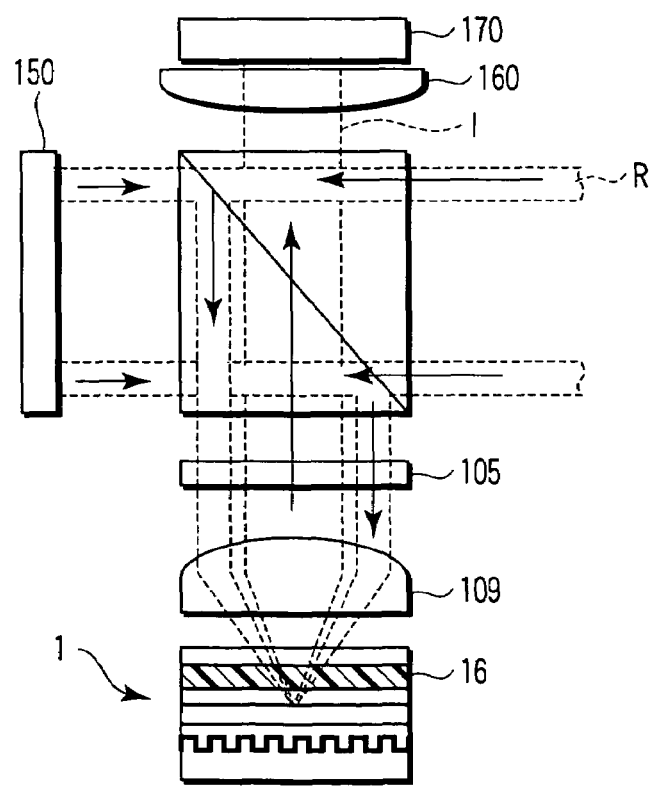
FIG. 19 is a diagram showing a state that the information beam is reproduced.

Next, the recorded information is reproduced by using the reproducing beam with the controlled wavelength. As shown in FIG. 15, the reference beam section 32 of the page data pattern is displayed on the spatial light modulator 150. As is the case of recording, the beam emitted from the laser diode 101 is applied to the medium 1. The beam is diffracted by the recorded hologram, passes the lenses 109, 108, 107, the dichroic prism 106, the quarter-wave plate 105, and PBS 104 and reaches the photo-detector 170. In the photo-detector 170, an image of the page data pattern is obtained, and, as a result, the information beam (I) is reconstructed. FIG. 19 shows a state that the information beam (I) is reconstructed. The resultant image is subjected to image processing so as to reduce an error rate, and then decoding is performed to obtain output data.

To order to perform addressing servo, tracking servo and focusing servo in recording and reproduction, a beam emitted from the laser diode 102 for servo with a longer wavelength (for example, 650 nm) than the recording and reproducing beam is used. The beam emitted from the laser diode 102 for servo is collimated through the collimator lens 111, passes a 650-nm polarization beam splitter (PBS) 112 and 650-nm quarter-wave plate 113, is reflected by the dichroic prism 106, passes lenses 107, 108, 109, and is applied to the servo surface of the medium 1. The beam reflected from the servo surface returns to lenses 109, 108, 107, is reflected by the dichroic prism 106, passes the quarter-wave plate 113, is reflected by the PBS 112, passes lenses 114, 115, and reaches a split photodiode 116. Servo is carried out in accordance with the servo beam detected by the split photodiode 116.

In FIG. 2, a laser diode 101 with a wavelength of 405 nm for recording and reproduction and a laser diode 102 with a wavelength of 650 nm for servo are used. However, a dual-wavelength laser diode which can emit beams with wavelengths of 405 nm and 650 nm may be used. The use of the dual-wavelength laser diode allows not only to improve the positioning accuracy of the optical system but also to achieve downsizing of the pickup and improved manufacturing yield.

Next, the wavelength variation detector detecting a wavelength variation of the reproducing beam to the recording beam will be described. In a holographic recording and reproduction apparatus according to embodiments of the present invention, the wavelength variation detector may be provided separately from the photo-detector for reproduction or the photo-detector for reproduction may be used as the wavelength variation detector. The optical system for introducing a beam to the wavelength variation detector may be a mirror or a reflection grating. Another wavelength dispersion element may be used instead of the reflection grating. Any optical system suitable to detect the wavelength variation of the reproducing beam would be selected.

Figure 23:
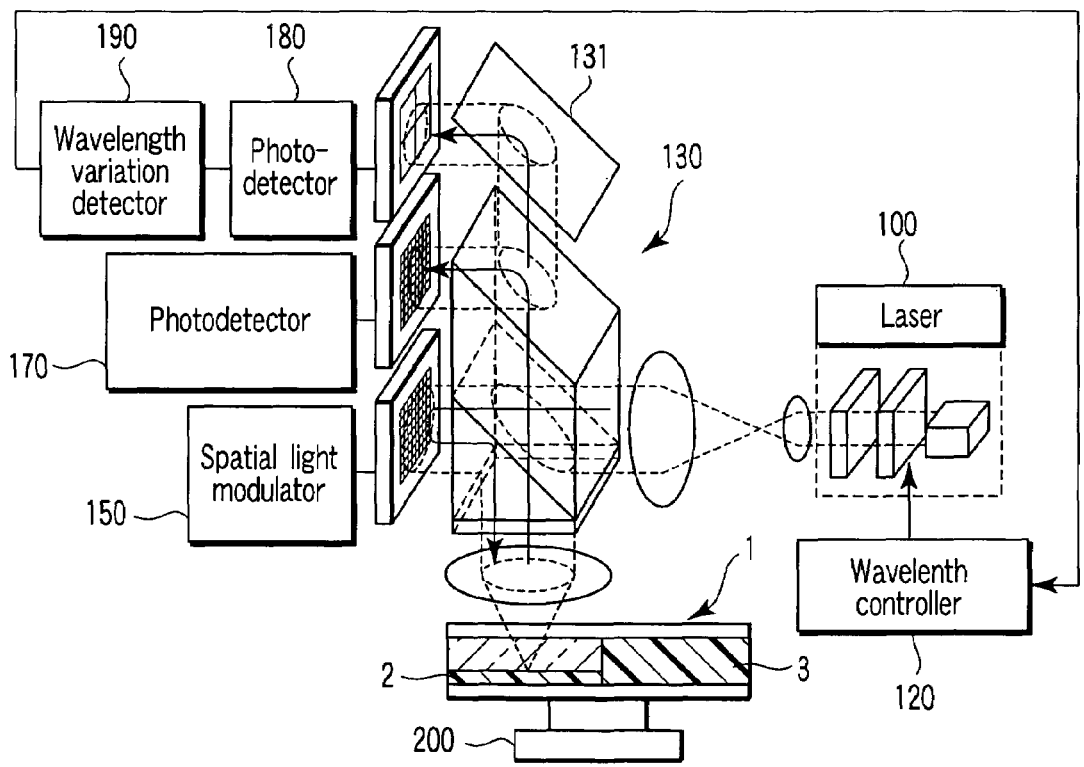
FIG. 23 is a diagram schematically showing a holographic recording and reproducing apparatus according to a modified embodiment.

The holographic recording and reproduction apparatus shown in FIG. 23 has the photo-detector 180 for wavelength variation detection in addition to the photo-detector 170 for reproduction and has the mirror 131 as the optical system for introducing a beam to the photo-detector 180 for wavelength variation detection.

Figure 24:
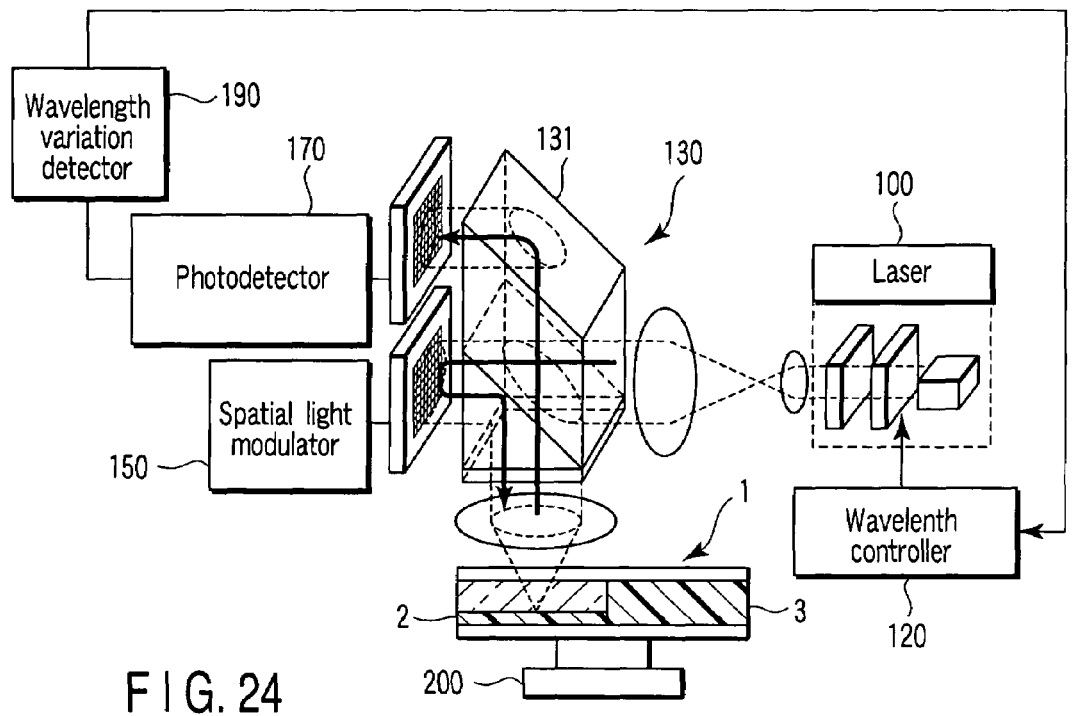
FIG. 24 is a diagram schematically showing a holographic recording and reproducing apparatus according to a modified embodiment.

The holographic recording and reproduction apparatus shown in FIG. 24 uses the photo-detector 170 both for reproduction and for wavelength variation detection and has the mirror 131 as the optical system for introducing a beam to the photo-detector 170.

Figure 25:
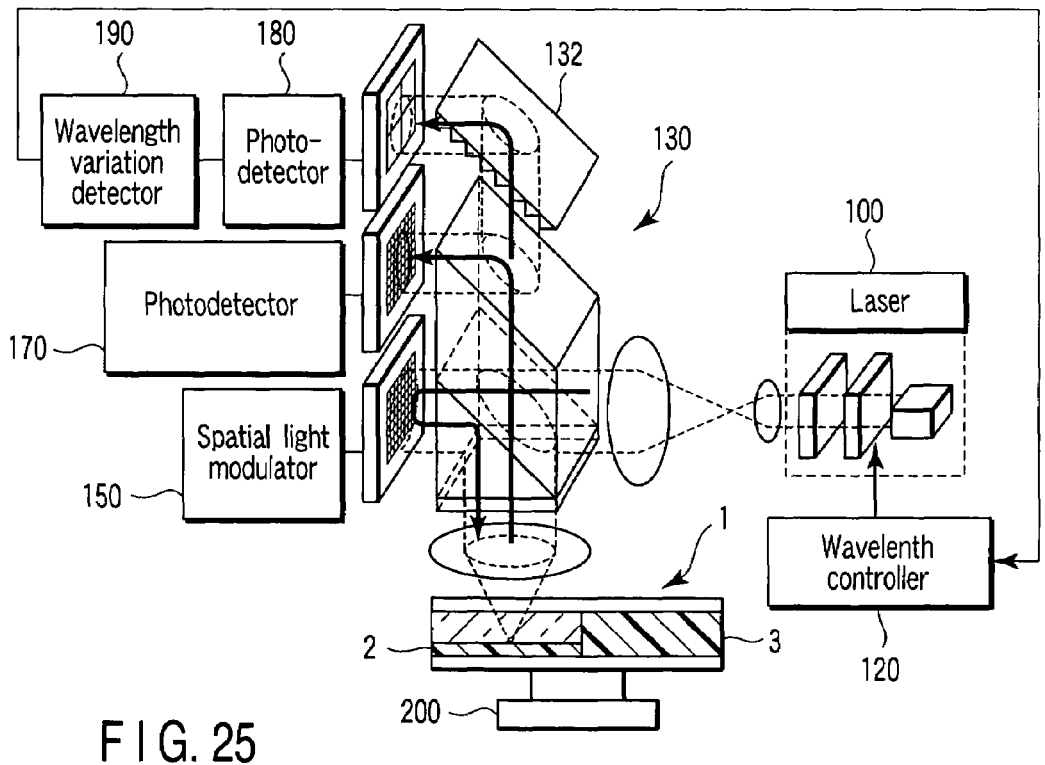
FIG. 25 is a diagram schematically showing a holographic recording and reproducing apparatus according to a modified embodiment.

The holographic recording and reproduction apparatus shown in FIG. 25 has the photo-detector 180 for wavelength variation detection in addition to the photo-detector 170 for reproduction and has the reflection grating 132 as the optical system for introducing a beam to the photo-detector 180 for wavelength variation detection.

The holographic recording and reproduction apparatus shown in FIG. 26 uses the photo-detector 170 both for reproduction and for wavelength variation detection and has the reflection grating 132 as the optical system for introducing a beam to the photo-detector 170.

Now, a method of detecting a wavelength variation with the aforementioned holographic recording and reproduction apparatuses will be described.

Figure 27A:
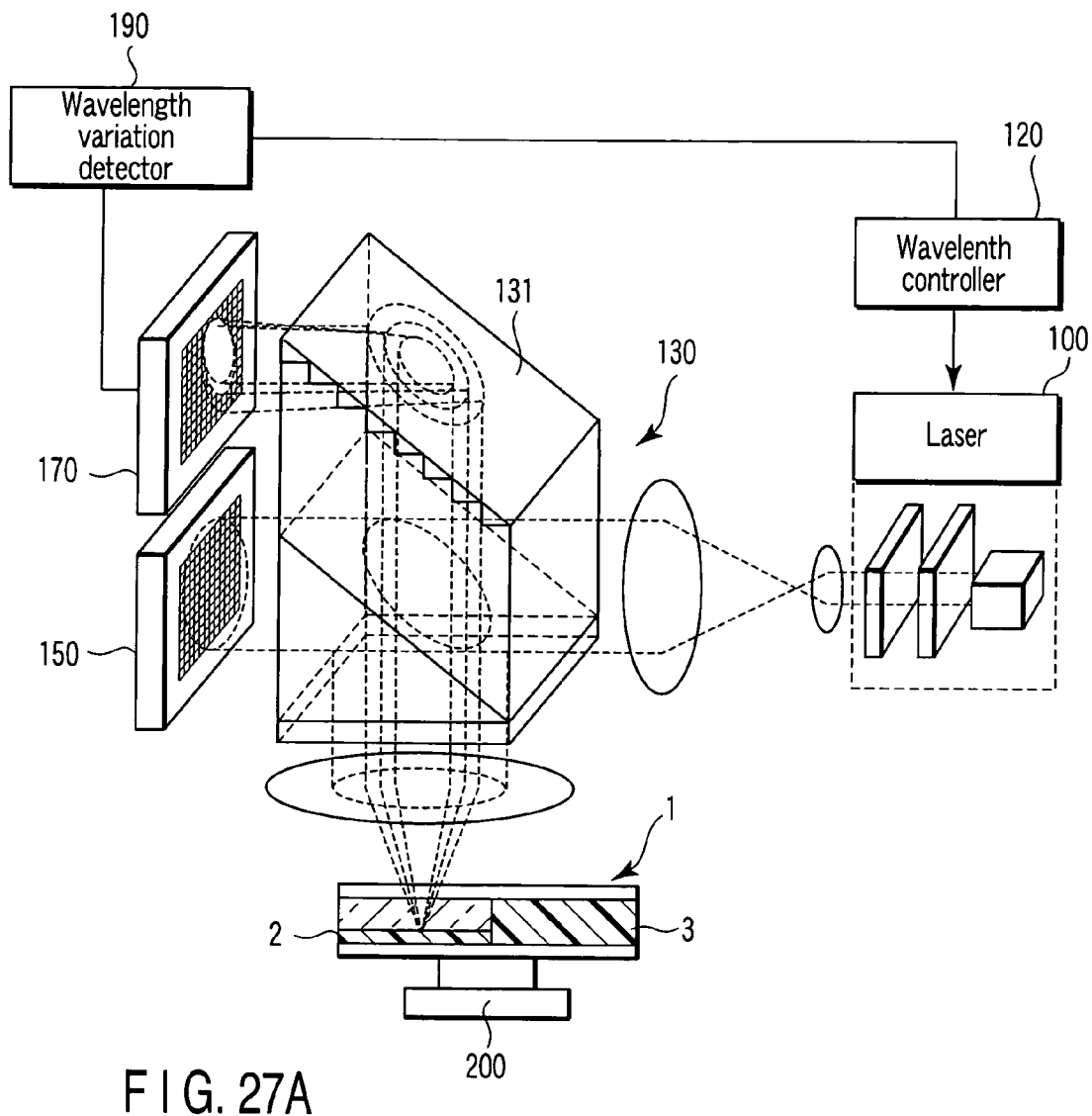
FIGS. 27A and 27B are diagrams showing a method of wavelength variation detection by a holographic recording and reproducing apparatus according to an embodiment of the present invention.

FIG. 27A shows a holographic recording and reproducing apparatus corresponding to that shown in FIG. 26, which uses the photo-detector 170 both for reproduction and for wavelength variation detection and has the reflection grating 132 as the optical system for introducing a beam to the photo-detector 170.

Figure 27B:
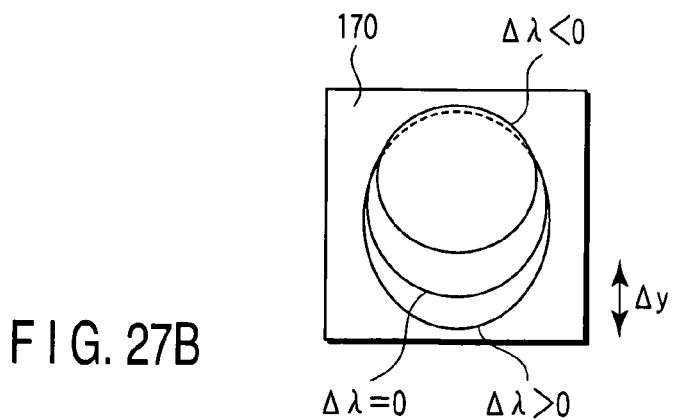

Using the holographic recording and reproduction apparatus shown in FIG. 27, the second recording zone 3 for the wavelength variation reference pattern of the holographic recording medium 1 is irradiated with a reproducing beam. Assume that the wavelength of the reproducing beam is varied from the wavelength of the recording beam by $\Delta\lambda$. The outgoing angle of the diffraction beam from the spots of the wavelength variation reference pattern emitted from the holographic recording medium 1 would be deviated in accordance with the wavelength variation $\Delta\lambda$. In this case, as shown in FIG. 27B, the size of the image for wavelength variation reference formed on the photo-detector 170 is varied depending on the wavelength variation $\Delta\lambda$. In FIG. 27B, the image forming a nearly circular contour represented by $\Delta\lambda=0$ is obtained if the wavelength of the reproducing beam coincides with the wavelength of the recording beam. In the case of $\Delta\lambda<0$, i.e., the reproducing beam has a shorter wavelength as compared to the recording beam, the image for wavelength variation reference is contracted and the center of the image is deviated to a direction. In the case of $\Delta\lambda>0$, i.e., the reproducing beam has a longer wavelength as compared to the recording beam, the image for wavelength variation reference is expanded and the center the image is deviated in the direction opposite to the case of $\Delta\lambda<0$. In this way, when the reflection grating 132 is used as a part of the optical system, the deviation of the optical path is emphasized because the diffraction angle varies in accordance with the wavelength and the change in the size of the image for wavelength variation reference can be detected more easily. Therefore, the wavelength variation of the reproducing beam to that of the recording beam can be determined more easily.

Figures 28A, 28B:
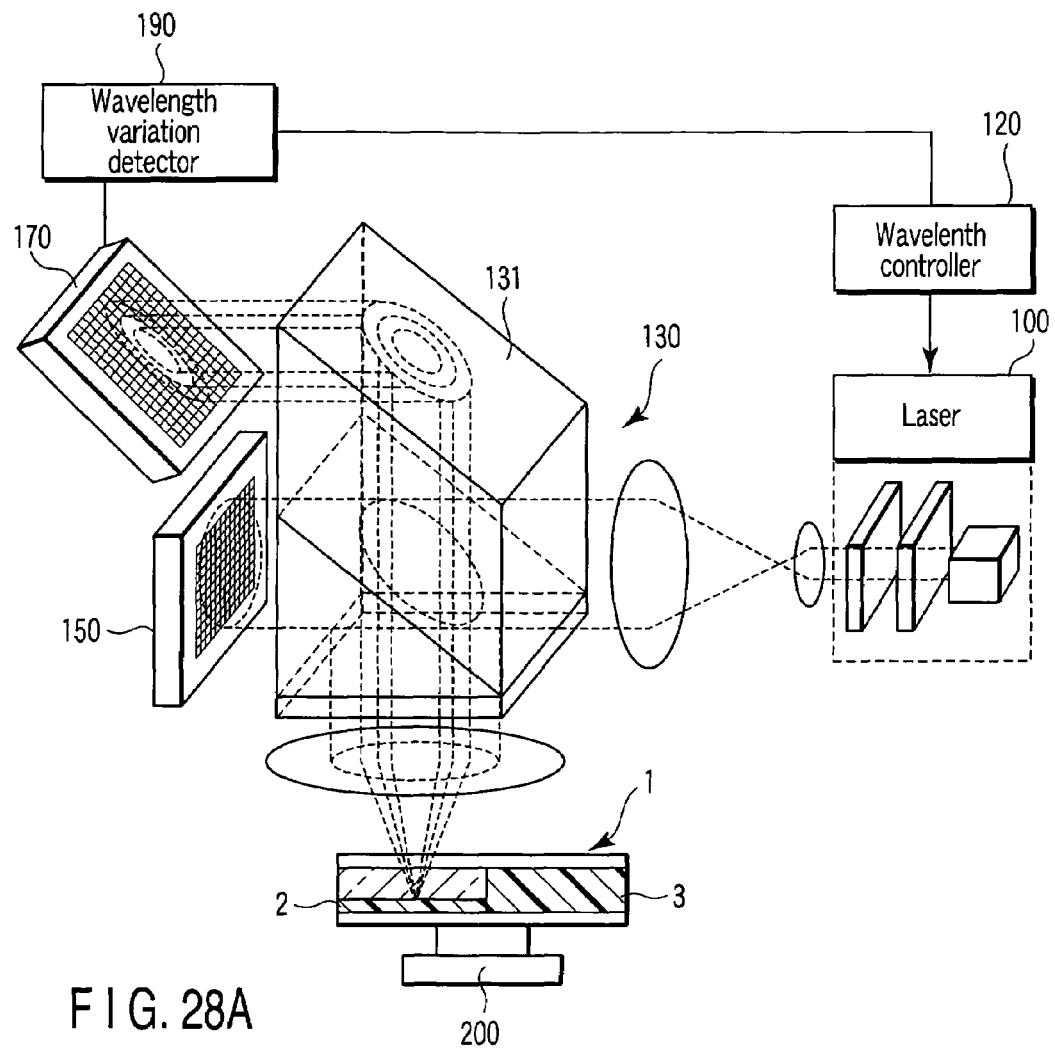
FIGS. 28A and 28B are diagrams showing a method of wavelength variation detection by a holographic recording and reproducing apparatus according to another embodiment of the present invention.

FIG. 28A shows a holographic recording and reproduction apparatus corresponding to that shown in FIG. 24, which uses the photo-detector 170 both for reproduction and for wavelength variation detection and has the mirror 131 as the optical system for introducing a beam to the photo-detector 170. The photo-detector 170 is tilted to the optical path of the beam reflected by the mirror 131.

Using the holographic recording and reproduction apparatus shown in FIG. 28A, the second recording zone 3 for the wavelength variation reference pattern of the holographic recording medium 1 is irradiated with a reproducing beam. In this case, as shown in FIG. 28B, the size of the image for wavelength variation reference formed on the photo-detector 170 is varied in accordance with the wavelength variation $\Delta\lambda$. In FIG. 27B, the image forming an elliptical contour represented by $\Delta\lambda=0$ is obtained if the wavelength of the reproducing beam coincides with the wavelength of the recording beam. In the case of $\Delta\lambda<0$, i.e., the reproducing beam has a shorter wavelength as compared to the recording beam, the image for wavelength variation reference becomes a contracted ellipse. In the case of $\Delta\lambda>0$, i.e., the reproducing beam has a longer wavelength as compared to the recording beam, the image for wavelength variation reference becomes an expanded ellipse. In this way, even when the mirror 131 is used as a part of the optical system, the change in the size of the image for wavelength variation reference can be detected more easily by tilting the light-receiving surface of the photo-detector 170. Therefore, the wavelength variation of the reproducing beam to that of the recording beam can be determined more easily.

A magnifying optical system such as a lens may be inserted in the holographic recording and reproduction apparatus in order to magnify the image for wavelength variation reference. The lens may be of any type such as a circular lens and a cylindrical lens. In this system, a photo-detector for wavelength variation detection is provided in addition to the photo-detector for reproduction.

Further, description will be made on the wavelength controller which controls the wavelength of the light source based on this detection result of the wavelength variation of the reproducing beam from the image for wavelength variation reference formed on the photo-detector. To control the emission wavelength of a laser diode as the light source, a method of varying the temperature of the laser oscillator or a method of using an external resonator may be used.

Here, it suffices to control the wavelength of the reproducing beam only. Thus, it is desirable that the wavelength controller is arranged between the light source laser diode and the optical system and adapted to allow only the reproducing beam to pass so that the power of the recording beam would be ensured.

Figure 29:
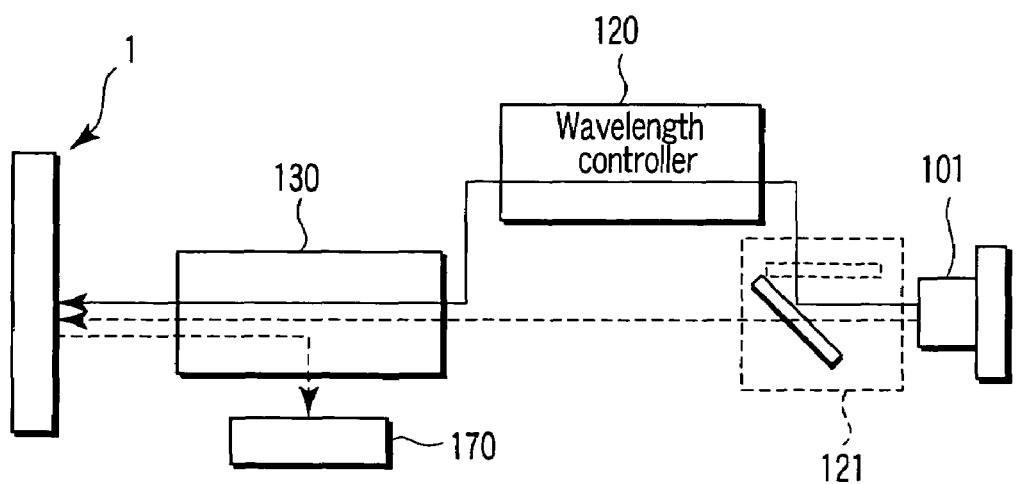
FIG. 29 is a diagram schematically showing a holographic recording and reproducing apparatus according to a modified embodiment.

The holographic recording and reproduction apparatus shown in FIG. 29 has an optical path switcher 121 and the wavelength controller 120 between the laser 101 and the optical system 130. The recording beam emitted from the laser 101 passes the optical path switcher 121, and then is applied to the holographic recording medium 1 via the optical system 130 without passing the wavelength controller 120. On the other hand, the reproducing beam emitted from the laser 101 passes the optical path switcher 121, and passes the wavelength controller 120 at which wavelength control is performed, and then is applied to the holographic recording medium 1 via the optical system 130. In this way, the recording beam can ensure a sufficient power because it does not pass the wavelength controller 120.

Figure 30:
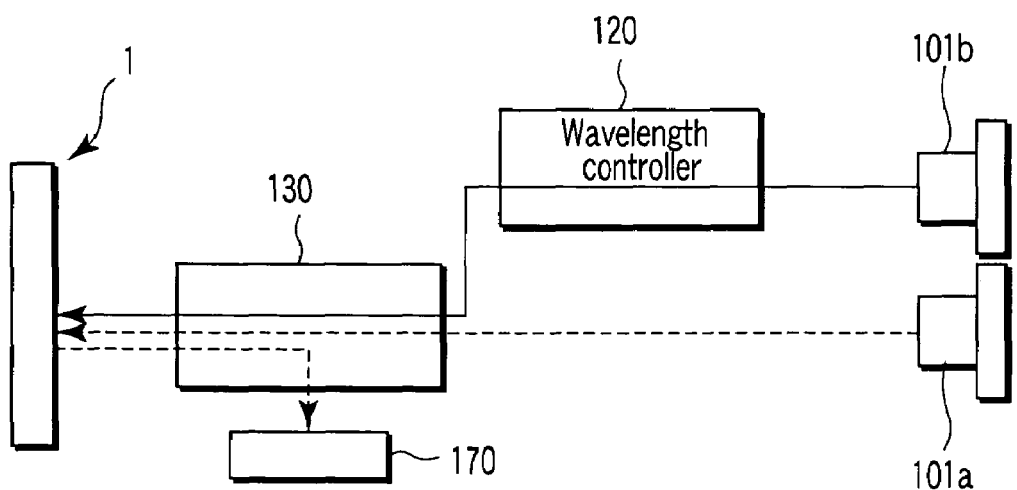
FIG. 30 is a diagram schematically showing a holographic recording and reproducing apparatus according to a modified embodiment.

The holographic recording and reproducing apparatus shown in FIG. 30 has the recording laser 101*a* and the reproducing laser 101*b*, and has the wavelength controller 120 between the reproducing laser 101*b* and the optical system 130. The recording beam emitted from the recording laser 101*a* is applied directly to the holographic recording medium 1 via the optical system 130. On the other hand, the reproducing beam emitted from the reproducing laser 101*b* passes the wavelength controller 120 at which wavelength control is performed, and the is applied to the holographic recording medium 1 via the optical system 130. In this way, the recording beam can ensure a sufficient power because it does not pass the wavelength controller 120.

Now, the wavelength controller controlling the wavelength of the light source wavelength will be described more specifically. In the following, examples using a distributed Bragg-reflector (DBR) GaN-based laser diode as a light source will be described. The DBR laser has a Bragg reflection mirror comprising a diffraction grating fabricated at the rear of a general laser diode on the same substrate.

The light source shown in FIG. 31 includes a first laser diode 1001 with a wavelength of $\lambda 1$, a second laser diode 1002 with a wavelength of $\lambda 2$, and a third laser diode 1003 with a wavelength of $\lambda 3$. The respective laser diodes 1001, 1002 and 1003 are oscillated by supplying a current between the upper and lower electrodes. Because the emission wavelength is defined based on the pitch of the diffraction grating, the pitches of the respective diffraction gratings are designed variously in accordance with the wavelengths $\lambda 1$, $\lambda 2$, $\lambda 3$. In addition, the wavelengths of the respective laser diodes 1001, 1002, and 1003 can be fine-tuned by supplying a current to the electrodes 1201, 1202 and 1203 for fine-tuning the wavelength. This is because the injected current causes a plasma effect in the semiconductor and brings about a change in the refractive index. Each of the laser diodes 1001, 1002, 1003 is connected to a multiplexer 1100. For the multiplexer 1100, an optical star coupler may be used, for example. For the multiplexer, a device using a diffraction grating, a prism, or an interference filter as a basic element may be used. Any multiplexer can introduce and transmit the emission beams from the laser diodes into one light guide. The wavelength controller has the laser selector 1200 connected to the wavelength variation detector 190.

Figure 32:
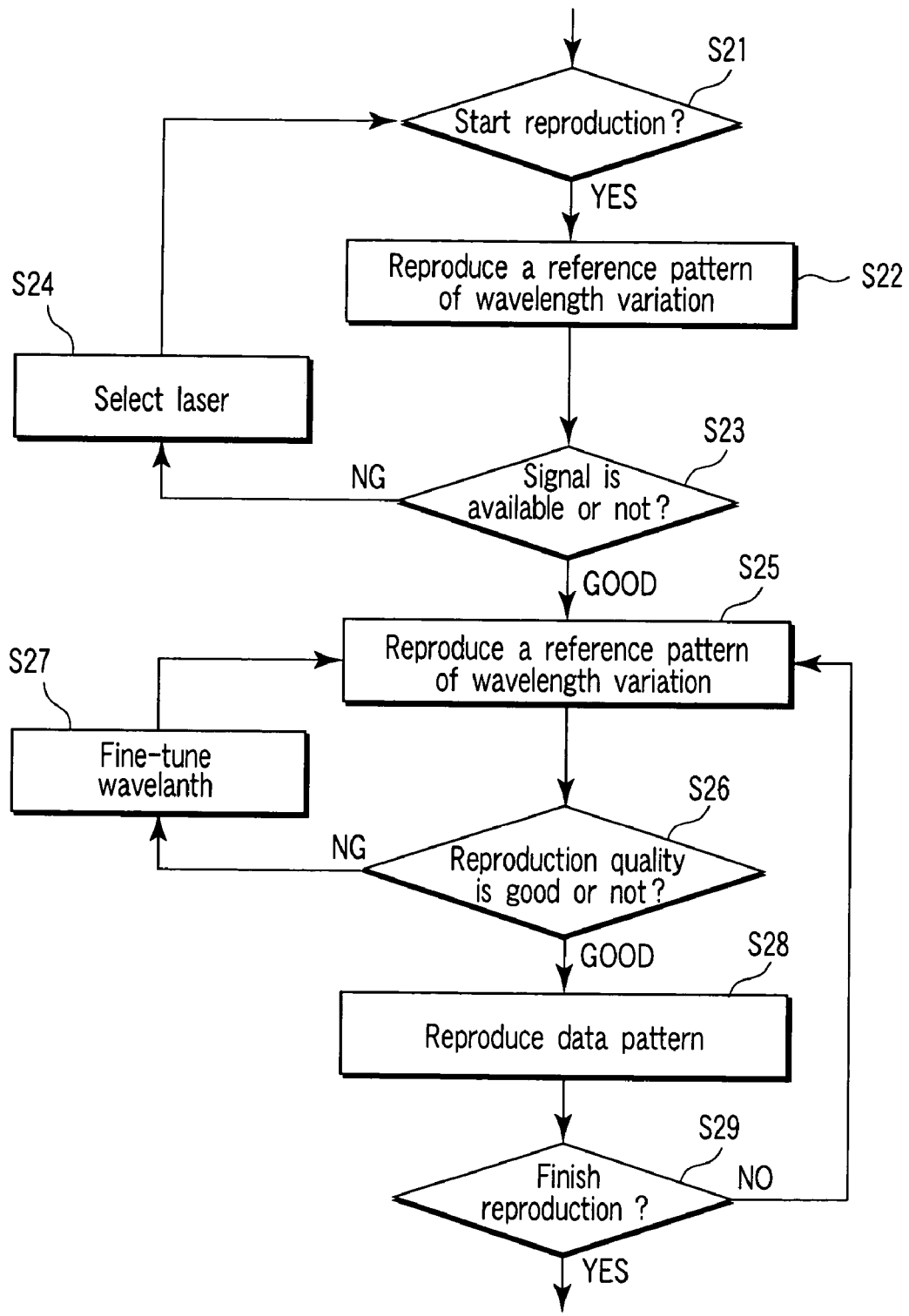
FIG. 32 is a flow chart showing a sequence of reproduction with the holographic recording and reproducing apparatus of FIG. 31.

As shown in FIG. 32, reproduction is started (S21), the laser diodes 1001, 1002, 1003 are successively oscillated by the laser selector 1200 at the beginning of the reproduction so as to reproduce the wavelength variation reference pattern (S22), and whether the image for wavelength variation reference can be obtained or not is judged (S23). Then, a specific laser diode with which the wavelength variation reference image can be obtained is selected (S24). The selected laser diode is oscillated so as to reproduce the wavelength variation reference pattern (S25), and the reproduction quality is judged (S26). If the reproduction quality is not good, the emission wavelength of the laser is fine-tuned by changing a current to be supplied to the electrodes for fine-tuning the wavelength (S27). When the wavelength variation reference pattern is reproduced (S25) and the reproduction quality is determined to be good (S26), the page data pattern is reproduced (S28). Thereafter, whether the reproduction is finished is determined (S29).

A multi-electrode distributed feedback (DFB) laser may be used as a wavelength variable laser. An SSG-DBR laser which is a distributed Bragg-reflector (DBR) laser added with a phase adjustment region or an amplification region may be used.

Figure 33:
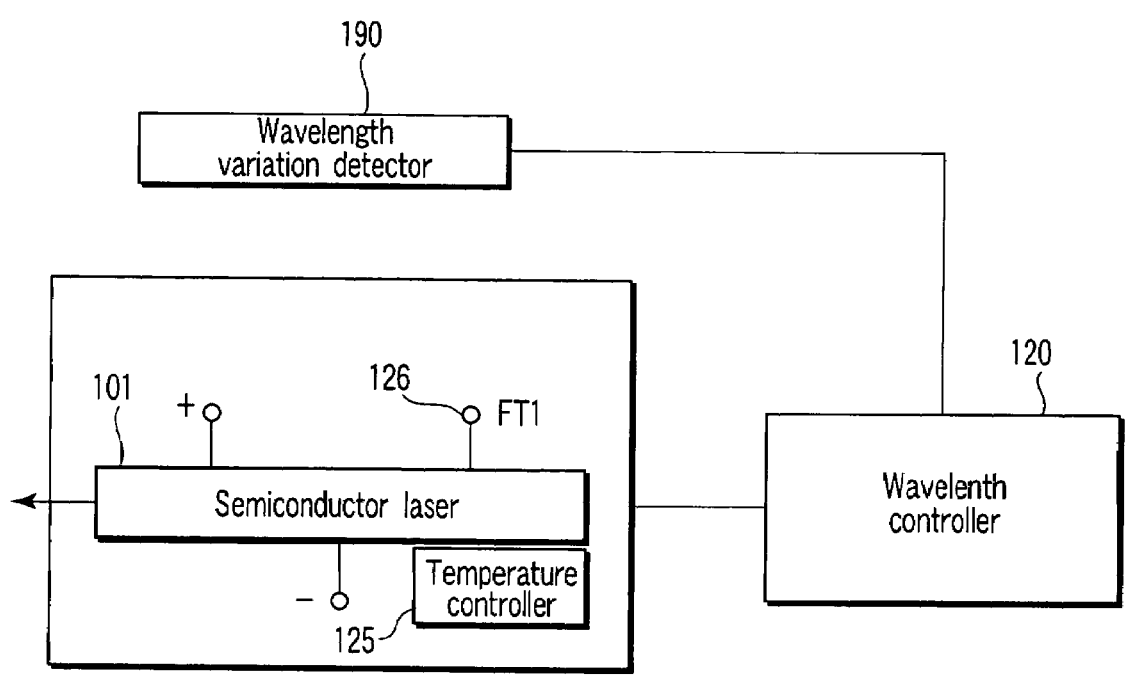
FIG. 33 is a diagram showing a wavelength controller of a holographic recording and reproducing apparatus according to another embodiment of the present invention.

The light source shown in FIG. 33 is a distributed Bragg-reflector (DBR) GaN-based laser diode 101 provided with a temperature controller 125 in the vicinity of the Bragg reflection mirror. The laser diode 101 is oscillated by supplying a current between the upper and lower electrodes. The temperature controller 125 includes a Peltier element or a thin-film microheater formed on a bed to which the laser diode is mounted. By controlling the temperature of laser diode 101 depending on the current supplied to the temperature controller 125, the refractive index of the laser diode is greatly varied and the emission wavelength can be greatly varied. In addition, by supplying a current to the electrode 126 for fine-tuning the wavelength, the emission wavelength can be finely tuned.

As shown in FIG. 34, reproduction is started (S31), the laser diode 101 is oscillated to reproduce the wavelength variation reference pattern (S32), and whether the image for wavelength variation reference can be obtained or not is judged (S33). In the case where the image for wavelength variation reference cannot be obtained, the emission wavelength is roughly tuned by controlling the temperature (S34). After setting the emission wavelength to a nearly desired value, when the wavelength variation reference pattern is reproduced (S35) and the reproduction quality is determined to be not good (S36), the current supplied to the electrodes for fine-tuning the wavelength is varied so as to fine-tune the emission wavelength (S37). When the wavelength variation reference pattern is reproduced (S35), and the reproduction quality is determined to be geed (S36), the page data pattern is reproduced (S38). Thereafter, whether the reproduction is finishes is determined (S39).

Because the wavelength of the reproducing beam is controlled so as to coincide with that of the recording beam in a manner as described above, highly accurate reproduction can be achieved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of holographic recording and reproduction, the method comprising:

recording, to a holographic recording medium, a wavelength variation reference pattern as a hologram at a wavelength of a recording beam, the wavelength variation reference pattern allowing a determination of a wavelength variation between a recording beam and a reproducing beam based on a size of an image reproduced at a wavelength of the reproducing beam;

recording, to the holographic recording medium, a page data pattern as a hologram at the wavelength of the recording beam, the recording beam including an information beam carrying information and a reference beam, the information beam and the reference beam being collinear and generated by spatially modulating a light beam;

detecting the wavelength variation between the recording beam and the reproducing beam based on the size of the image for wavelength variation reference obtained by reproducing the wavelength variation reference pattern at the wavelength of the reproducing beam; and reproducing the page data pattern using the reproducing beam, the reproducing beam including a reference beam with a wavelength controlled based on the detected wavelength variation.

2. The method according to claim 1, wherein the wavelength variation reference pattern and the page data pattern are individually displayed with a spatial light modulator and are individually recorded to the holographic recording medium as a hologram.

3. The method according to claim 2, further comprising:
in recording the wavelength variation reference pattern, irradiating the holographic recording medium with spots arranged around the reference beam using the spatial light modulator to record the spots as a hologram;

in reproduction, irradiating the holographic recording medium with only the reference beam using the spatial light modulator; and detecting the wavelength variation of the reproducing beam to the recording beam based on the size of the image for wavelength variation reference that is reproduced.

4. A holographic recording medium, comprising:
a substrate having a servo surface; and
a holographic recording layer formed on the substrate, the holographic recording layer comprising a first recording zone for a page data pattern and a second recording zone for a wavelength variation reference pattern.

5. The holographic recording medium according to claim 4, wherein the wavelength variation reference pattern is recorded as a hologram at a wavelength of a recording beam and allows a determination of a wavelength variation between the recording beam and a reproducing beam based on a size of an image thereof reproduced at a wavelength of the reproducing beam.

6. The holographic recording medium according to claim 4, comprising a reflection layer, a lower gap layer and a wavelength selection layer stacked on the substrate having the servo surface, and further comprising an upper gap layer and a holographic recording layer with a first thickness which are stacked on the wavelength selection layer in the first recording zone for the page data pattern, and a holographic recording layer with a second thickness greater than the first thickness which is stacked on the wavelength selection layer without the upper gap layer in the second recording zone for the wavelength variation reference pattern.

7. The holographic recording medium according to claim 4, comprising a holographic recording layer with a third thickness in the first recording zone for the page data pattern and a holographic recording layer with a fourth thickness smaller than the third thickness and a step compensation layer in the second recording zone for the wavelength variation reference pattern.

8. The holographic recording medium according to claim 4, comprising a first holographic recording layer with a first refractive index in the first recording zone for the page data pattern and a second holographic recording layer with a second refractive index in the second recording zone for the wavelength variation reference pattern.

9. A holographic recording and reproducing apparatus by which information is recorded as a hologram to a holographic recording medium, comprising:
a light source;
a spatial light modulator spatially modulating intensity and/or phase of an optical beam from the light source to generate an information beam, a reference beam, and spots corresponding to a wavelength variation reference pattern;

an optical system configured to irradiate the holographic recording medium with the reference beam and the spots corresponding to the wavelength variation reference pattern as a recording beam for wavelength variation reference pattern, with the information beam and the reference beam collinearly as a recording beam, and with only the reference beam as a reproducing beam, respectively;

a photo-detector arranged on a same side as the optical system with respect to the holographic recording medium;

a wavelength variation detector detecting a wavelength variation of the reproducing beam to the recording beam based on a size of an image for wavelength variation reference obtained by the photo-detector by irradiating the wavelength variation reference pattern recorded to the holographic recording medium with the reproducing beam; and a wavelength controller controlling wavelength of the light source based on a detection result by the wavelength variation detector.

10. The apparatus according to claim 9, wherein the photo-detector comprises pixels arranged in a matrix, and wherein a size of the pixels in a peripheral region of the photo-detector is smaller than a size of the pixels in a central region of the photo-detector.

11. The apparatus according to claim 9, wherein the photo-detector is also used for wavelength variation detection.

12. The apparatus according to claim 9, wherein the wavelength controller is arranged between the light source and the optical system, and is configured to allow only the reproducing beam to pass.

13. The apparatus according to claim 9, wherein the wavelength variation detector comprises a reflection grating arranged in an optical path from the holographic recording medium to the photo-detector.

14. The apparatus according to claim 9, wherein the wavelength variation detector comprises a mirror arranged in an optical path from the holographic recording medium to the photo-detector.

15. The apparatus according to claim 14, wherein a light-receiving surface of the wavelength variation detector is tilted to an optical path of a beam reflected from the mirror.

16. The apparatus according to claim 9, wherein the light source comprises laser diodes each having an emission wavelength different from one another and provided with electrodes for fine-tuning the emission wavelength, and wherein the wavelength controller selects a specific laser diode of the laser diodes and finely tunes the emission wavelength thereof by supplying a current to the electrodes.

17. The apparatus according to claim 9, wherein the light source comprises a laser diode provided with a temperature controller and electrodes for fine-tuning the emission wavelength, and wherein the wavelength controller roughly tunes the emission wavelength of the laser diode with the temperature controller and finely tunes the emission wavelength by supplying a current to the electrodes.

* * * * *